(12) United States Patent
Baick

(10) Patent No.: US 11,527,108 B2
(45) Date of Patent: Dec. 13, 2022

(54) METHOD AND SYSTEM FOR VERIFYING USERS

(71) Applicant: LINE Plus Corporation, Seongnam-si (KR)

(72) Inventor: Joonsick Baick, Seongnam-si (KR)

(73) Assignee: LINE Plus Corporation, Gyeonggi-do (KR)

( * ) Notice: Subject to any disclaimer, the term of this patent is extended or adjusted under 35 U.S.C. 154(b) by 64 days.

(21) Appl. No.: 17/122,504

(22) Filed: Dec. 15, 2020

(65) Prior Publication Data

US 2021/0192189 A1    Jun. 24, 2021

(30) Foreign Application Priority Data

Dec. 20, 2019  (KR) .................. 10-2019-0172446

(51) Int. Cl.
| | | |
|---|---|---|
| *G06F 21/31* | (2013.01) | |
| *G06V 40/16* | (2022.01) | |
| *G06V 20/40* | (2022.01) | |
| *G06V 40/20* | (2022.01) | |
| *H04W 88/02* | (2009.01) | |

(52) U.S. Cl.
CPC ............ *G06V 40/172* (2022.01); *G06V 20/40* (2022.01); *G06V 40/20* (2022.01); *H04W 88/02* (2013.01)

(58) Field of Classification Search
CPC ...... G06V 40/172; G06V 20/40; G06V 40/20; G06V 20/41; G06V 40/67; G06V 40/16; H04W 88/02; H04N 7/181; G06F 21/32; G06F 21/31; G06F 21/45
See application file for complete search history.

(56) References Cited

U.S. PATENT DOCUMENTS

| | | | |
|---|---|---|---|
| 10,853,680 B2* | 12/2020 | Fuchigami | G06T 3/4053 |
| 10,956,544 B1* | 3/2021 | Knas | G06V 40/172 |
| 2012/0109829 A1* | 5/2012 | McNeal | G16H 10/65 |
| | | | 705/67 |
| 2015/0026797 A1 | 1/2015 | Cao | |
| 2018/0089412 A1* | 3/2018 | Kopikare | G06F 40/174 |
| 2018/0268215 A1* | 9/2018 | Ovsiannikov | G06V 40/19 |
| 2019/0087404 A1* | 3/2019 | Scheur | G06F 40/211 |
| 2020/0210956 A1* | 7/2020 | de Malzac de Sengla | |
| | | | H04L 63/0245 |
| 2022/0050890 A1* | 2/2022 | Karantzis | H04L 63/0861 |

FOREIGN PATENT DOCUMENTS

| | | |
|---|---|---|
| JP | 6481074 B1 | 3/2019 |
| KR | 10-2001-0092888 A | 10/2001 |
| KR | 10-2018-0092775 A | 8/2018 |
| KR | 10-2019-0101836 A | 9/2019 |

* cited by examiner

*Primary Examiner* — Hien L Duong
(74) *Attorney, Agent, or Firm* — Harness, Dickey & Pierce, P.L.C

(57) ABSTRACT

The present disclosure relates to methods for verifying users performed by at least one processor. The method for verifying users including transmitting, to a user terminal, a plurality of instructions that guide a user to perform a plurality of actions, receiving, from the user terminal, a video photographed in response to the plurality of instructions, determining presence or absence of the user in the video, and verifying the user based on a face of the user extracted from the video in response to a result of the determining indicating that the user is present may be provided.

21 Claims, 15 Drawing Sheets

900

| | INSTRUCTION | RESOLUTION | | TRANSMISSION RATE |
|---|---|---|---|---|
| 1 | PLEASE FACE FORWARD AND LOOK STRAIGHT | 720p | | 1fps |
| 2 | PLEASE TURN YOUR FACE TO THE LEFT | 480p | | 5fps |
| 3 | PLEASE WRITE LETTER V | 240p | | 1fps |
| 4 | PLEASE MOVE YOUR ID CARD | 480p | | 5fps |
| 5 | PLEASE SHOW YOUR FACE AND YOUR ID CARD (SURFACE) | AREA 1 | AREA 2 | 1fps |
| | | 240p | 1024p | |
| ⋮ | ⋮ | ⋮ | | ⋮ |

| | INSTRUCTION | RESOLUTION | | TRANSMISSION RATE |
|---|---|---|---|---|
| 1 | PLEASE FACE FORWARD AND LOOK STRAIGHT | 720p | | 1fps |
| 2 | PLEASE TURN YOUR FACE TO THE LEFT | 480p | | 5fps |
| 3 | PLEASE WRITE LETTER V | 240p | | 1fps |
| 4 | PLEASE MOVE YOUR ID CARD | 480p | | 5fps |
| 5 | PLEASE SHOW YOUR FACE AND YOUR ID CARD (SURFACE) | AREA 1 240p | AREA 2 1024p | 1fps |
| | ... | ... | | ... |

FIG. 9

METHOD AND SYSTEM FOR VERIFYING USERS

CROSS-REFERENCE TO RELATED APPLICATION

This application claims priority under 35 U.S.C. § 119 to Korean Patent Application No. 10-2019-0172446, filed in the Korean Intellectual Property Office on Dec. 20, 2019, the entire contents of which are hereby incorporated by reference.

BACKGROUND

Technical Field

The present disclosure relates to methods and/or systems for verifying users, and more specifically, to methods and/or systems capable of receiving a video photographed by a user terminal, analyzing the received video, determining presence or absence of the user in the video, and processing user verification.

Description of the Related Art

With the proliferation of mobile devices such as smartphones and the development of the Internet, financial services, payment services and the like using mobile devices are widely used. In order to use such financial and payment services, real name verification of the user may be required. However, with the rapidly increasing number of uses of these services compared to the limited resources of the organizations providing verification services, providing the real name verification services through face-to-face real name verification may have limitations. Accordingly, recently, a service for verifying a user through non-face-to-face real name verification is actively researched in the field of image processing and recognition. For example, face information of a user extracted from an image photographed with a camera may be used to verify the user.

However, it is more difficult for the non-face-to-face real name verification to confirm that the person is who he or she claims to be, than the face-to-face real name verification, and there may be a problem that other person fraudulently claims to be the verified person. For example, there may be a problem that one may use another person's photo or paper printed with the same face appearing on another person's identification (ID) card and verified to be that another person. In addition, when the non-face-to-face real name verification is performed at a client device, when the client device transmits a result of the processed real name verification to a system that requires real name verification, there may be a disadvantage in that results of different real name are transmitted through cracking. Moreover, even when image recognition and processing for non-face-to-face real name verification is performed at a server device, there is a problem that an image transmitted from a client for non-face-to-face real name verification can be tampered with through interception and hacking of the transmitted and received information.

SUMMARY

In order to solve the problems described above, the present disclosure provides methods, non-transitory computer-readable storage mediums storing instructions, and/or systems for verifying users.

According to some example embodiments, users may be verified by transmitting a plurality of instructions that guide a user to perform a plurality of actions to a user terminal, receiving, from a user terminal, a video photographed according to the plurality of instructions, determining presence or absence of the user in the video, and, verifying the user based on a face of the user extracted from the video in response to a result of the determining indicating that the user is present.

According to some example embodiments, the video photographed through a camera may be received in real-time and continuously from the user terminal in the user verification process.

The present disclosure may be implemented in various ways, including methods, systems, or non-transitory computer-readable storage media storing instructions.

According to an example embodiment, a method for verifying users performed by at least one processor may include, transmitting, to a user terminal, a plurality of instructions that guide a user to perform a plurality of actions, receiving, from the user terminal; a video photographed in response to the plurality of instructions, determining presence or absence of the user in the video, and verifying the user based on a face of the user extracted from the video in response to a result of the determining indicating that the user is present.

According to an example embodiment, the receiving, from the user terminal, the video photographed in response to the plurality of instructions may include receiving the video from the user terminal in real-time through a channel for communication with the user terminal.

According to an example embodiment, the receiving, from the user terminal, the video photographed in response to the plurality of instructions may include continuously receiving the video through a channel for communication with the user terminal.

According to an example embodiment, the determining the presence or absence of the user in the video may include analyzing the video and first-determining whether the user performs the plurality of actions corresponding to the plurality of instructions in the video, and second-determining that the user is present in the video, in respond to a result of the first-determining indicating that the user performs the plurality of actions corresponding to the plurality of instructions.

According to an example embodiment, the plurality of instructions may include a first instruction and a second instruction, the receiving, from the user terminal, the video photographed in response to the plurality of instructions may include receiving, from the user terminal, a face-related video photographed in response to the first-instruction that guides to have a face of the user photographed, and receiving, from the user terminal, an identification (ID) card-related video photographed in response to the second-instruction that guides to have an ID card of the user photographed, and the verifying the user may include extracting first information on the face of the user from the face-related video, extracting second information on the face of the user from the ID card-related video, comparing the extracted first information and the extracted second information, and verifying the user in response to the extracted first information and the extracted second information being similar to each other with reference to a reference similarity value.

According to an example embodiment, the plurality of instructions may include a third instruction that guides to have a user's front face of the user photographed.

According to an example embodiment, the plurality of instructions may include a fourth instruction that guides to move the ID card of the user, the receiving the ID card-related video may include receiving, from the user terminal, a video of the ID card of the user photographed according to the fourth instruction, and the verifying the user may include determining presence or absence of the ID card of the user in the video based on a movement of the user's ID card obtained by analyzing the video.

According to an example embodiment, the ID card-related video may include a photographed video of at least a part of the user together with the ID card of the user, and the receiving the ID card-related video may include receiving a first area including at least the part of the user from the user terminal through a first channel, and receiving a second area including the ID card of the user from the user terminal through a second channel.

According to an example embodiment, the transmitting, to the user terminal, the plurality of instructions that guide the user to perform the plurality of actions may include randomly selecting the plurality of instructions from among a plurality of instruction candidates, and transmitting the plurality of randomly selected instructions to the user terminal.

According to an example embodiment, the transmitting, to the user terminal, the plurality of instructions that guide the user to perform the plurality of actions may include transmitting, to the user terminal, a first instruction that guides the user to perform the first action from among the plurality of instructions, the receiving, from the user terminal, the video photographed in response to the plurality of instructions may include receiving, from the user terminal, a first video photographed in response to the first instruction, and the determining the presence or absence of the user in the video may include analyzing the first video photographed in response to the first instruction and determining whether the user performs the first action in response to the first instruction.

According to an example embodiment, the transmitting, to the user terminal, the plurality of instructions that guide the user to perform the plurality of actions may include transmitting, to the user terminal, a second instruction that guides the user to perform a second action from among the plurality of instructions, in response to a result of the determining indicating that the user performs the first action, the receiving, from the user terminal, the video photographed in response to the plurality of instructions may include receiving, from the user terminal, a second video photographed in response to the second instruction, and the determining the presence or absence of the user in the video may include analyzing the second video photographed in response to the second instruction and determining whether the user performs the second action in response to the second instruction.

According to an example embodiment, the transmitting, to the user terminal, the plurality of instructions that guide the user to perform the plurality of actions may include transmitting, to the user terminal, a third instruction that guides the user to perform a third action, in response to a result of the determining indicating that the user does not perform the first action, and the third instruction may be selected based on a difference between an action of the user obtained from analysis of the first video photographed in response to the first instruction and the first action.

According to an example embodiment, the method may further include, communicating with the user terminal using a first channel different from a second channel used for communication with the user terminal in response to a result of the determining indicating that the user does not perform the first action.

According to an example embodiment, the transmitting, to the user terminal, the plurality of instructions that guide the user to perform the plurality of actions may include transmitting, to the user terminal, information on a plurality of resolutions corresponding to the plurality of instructions together with the plurality of instructions.

According to an example embodiment, each of the plurality of resolutions corresponding to the plurality of instructions may include a resolution for a corresponding one of a plurality of areas on a screen displaying the video photographed corresponding to the plurality of instructions.

According to an example embodiment, the plurality of instructions may include an instruction that guides to have at least a part of the user and an ID of the user card photographed together, the plurality of resolutions includes a first resolution and a second resolution, and the first resolution of a first area in which the ID card of the user is guided to be photographed may be set to be higher than the second resolution of a second area in which at least the part of the user is guided to be photographed.

According to an example embodiment, the transmitting, to the user terminal, the plurality of instructions that guide the user to perform the plurality of actions may include transmitting, to the user terminal, information on a transmission rate corresponding to each of the plurality of instructions together with the plurality of instructions.

There is provided a non-transitory computer-readable recording medium storing computer-readable instructions that, when executed by at least one processor, cause a computer to execute the method for verifying users described above.

According to an example embodiment, a system for verifying users may include a memory, and at least one processor connected to the memory and configured to execute computer-readable commands stored in the memory such that the at least one processor is be configured to transmit, to a user terminal, a plurality of instructions that guide a user to perform a plurality of actions, receive, from the user terminal, a video photographed in response to the plurality of instructions, determine presence or absence of the user in the video, and verify the user based on a face of the user extracted from the video, in response to a result of the determining indicating that the user is present.

According to an example embodiment, the at least one processor may be further configured to receive the video from the user terminal in real-time through a channel for communication with the user terminal.

According to some example embodiments of the present disclosure, the video received from the user terminal is analyzed to determine the presence or absence of the user, and when it is determined that the user is present, user verification is proceeded. Accordingly, it is possible to prevent the use of a photo or a printed paper for user verification.

According to some example embodiments of the present disclosure, because the user verification service is provided by analyzing a video received in real-time, it is possible to solve a problem in which an image or a video for use in the user verification process is manipulated.

According to some example embodiments of the present disclosure, because the system for verifying users performs user verification by analyzing the video received from the user terminal in real-time, it is possible to provide a user verification service through a web browser as well as an application providing a user verification service.

The effects of the present disclosure are not limited to the effects described above, and other effects not mentioned will be able to be clearly understood by those of ordinary skill in the art (referred to as "those skilled in the art") from the description of the claims.

BRIEF DESCRIPTION OF THE DRAWINGS

Some example embodiment of the present disclosure will be described with reference to the accompanying drawings described below, where similar reference numerals indicate similar components, but not limited thereto, in which:

FIG. 9 is a diagram illustrating an example instruction information DB according to an example embodiment;

DETAILED DESCRIPTION

Figure 1:
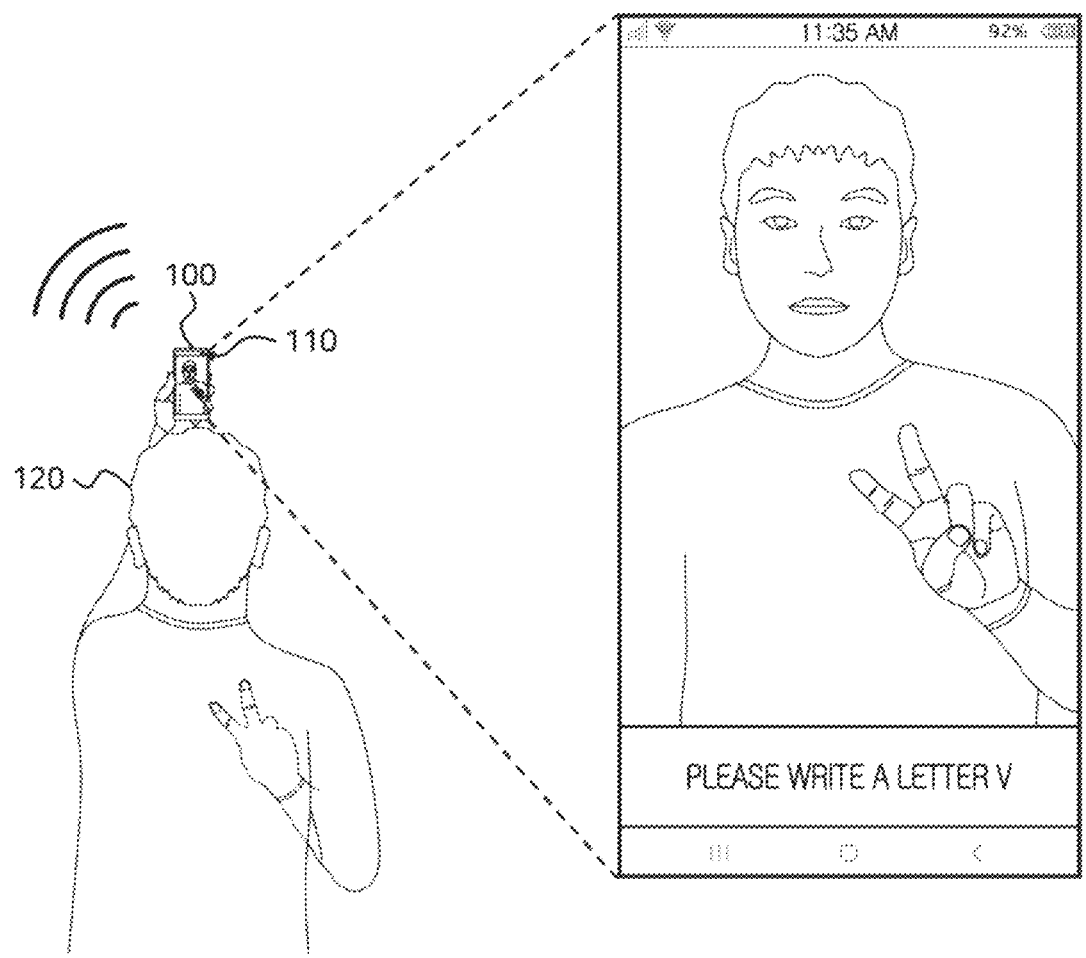
FIG. 1 is an example diagram illustrating a photographed video of a user performing an action according to an instruction displayed on a user terminal, in a process of verifying a user according to an example embodiment.

Hereinafter, specific details for the practice of the present disclosure will be described in detail with reference to the accompanying drawings. However, in the following description, detailed descriptions of well-known functions or configurations will be omitted when it may make the subject matter of the present disclosure rather unclear.

In the accompanying drawings, the same or corresponding components are given the same reference numerals. In addition, in the following description of the example embodiments, duplicate descriptions of the same or corresponding components may be omitted. However, even if descriptions of components are omitted, it is not intended that such components are not included in any example embodiment.

Advantages and features of the disclosed example embodiments and methods of accomplishing the same will be apparent by referring to the example embodiments described below in connection with the accompanying drawings. However, the present disclosure is not limited to the example embodiments disclosed below, and may be implemented in various different forms, and the present example embodiments are merely provided to make the present disclosure complete, and to fully disclose the scope of the present disclosure to those skilled in the art to which the present disclosure pertains.

The terms used herein will be briefly described prior to describing the disclosed example embodiments in detail. The terms used herein have been selected as general terms, which are widely used at present in consideration of the functions of the present disclosure, and this may be altered according to the intent of an operator skilled in the art, conventional practice, or introduction of new technology. In a specific case, a term could be arbitrarily selected by the applicant, and the meaning of the term will be described in detail in a corresponding description of the example embodiments. Therefore, the terms used in the present disclosure should be defined based on the meaning of the terms and the overall contents of the present disclosure rather than a simple name of each of the terms.

As used herein, the singular forms 'a,' 'an,' and 'the' are intended to include the plural forms as well, unless the context clearly indicates the singular forms. Further, the plural forms are intended to include the singular forms as well, unless the context clearly indicates the plural forms. Further, throughout the description, when a portion is stated as "comprising (including)" a component, it intends to mean that the portion may additionally comprise (or include or have) another component, rather than excluding the same, unless specified to the contrary.

Further, the term "module" or "unit" used herein refers to a software or hardware component, and "module" or "unit' performs certain roles. However, the meaning of the "module" or "unit" is not limited to software or hardware. The "module" or "unit" may be configured to be in an addressable storage medium or configured to execute at least one process. Accordingly, as an example, the "module" or "unit" may include components such as software components, object-oriented software components, class components, and task components, and at least one of processes, functions, attributes, procedures, subroutines, program code segments of program code, drivers, firmware, micro-codes, circuits, data, database, data structures, tables, arrays, or variables. Furthermore, functions provided in the components and the "modules" or "units" may be combined into a smaller number of components and "modules" or "units", or further divided into additional components and "modules" or "units."

According to an example embodiment of the present disclosure, the "module" or "unit" may be implemented as a processor and a memory. A "processor" should be interpreted broadly to encompass a general-purpose processor, a central processing unit (CPU), a microprocessor, a digital signal processor (DSP), a controller, a microcontroller, a state machine, and so forth. Under some circumstances, the "processor" may refer to an application-specific integrated circuit (ASIC), a programmable logic device (PLD), a field-programmable gate array (FPGA), and so on. The "processor" may refer to a combination of processing devices, e.g., a combination of a DSP and a microprocessor, a plurality of microprocessors, one or more microprocessors in conjunction with a DSP core, or any other combination of such configurations. In addition, the "memory" should be interpreted broadly to encompass any electronic component capable of storing electronic information. The "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, and so on. The memory is said to be in electronic communication with a processor if the processor can read information from and/or write information to the memory. The memory that is integral to a processor is in electronic communication with the processor.

In the present disclosure, the "system" may refer to at least one of a server device and a cloud device, but not limited thereto. For example, the system may include one or more server devices. As another example, the system may include one or more cloud devices. As another example, the system may be configured with both a server device and a cloud device.

In the present disclosure, "image" may include one or more images, and may refer to a video including a plurality of images.

In the present disclosure, "video" includes a plurality of images photographed by a camera, and may refer to an image of one or more objects moving in the image. For example, the video may include all of the images photographed at the user terminal. As another example, the video may include an image corresponding to a frame extracted from among the images photographed at the user terminal and/or some images. In an example, the number of frames or images extracted from the video photographed at the user terminal may be adjusted.

In the present disclosure, "photographed video of a user performing an action" includes a photographed video of the user performing an action with his or her body and/or object. For example, the body of the user may include a face, hands, arms, legs, and the like. In addition, the object may mean an object that a user can hold in hand and perform any action with it, and may include, for example, an identification (ID) card or the like, but is not limited thereto.

In the present disclosure, "determining presence or absence of the user" may include determining whether the user is present in real world. For example, presence or absence of the user in the video photographed in response to a plurality of instructions may refer to actual presence or absence of the user in the photographed video in real world.

In an example, it may be determined that the user is not present when an image, paper, video, and the like acquired or photographed by the user terminal has an image of a user different from the actual user himself/herself.

In the present disclosure, "receive in real-time" may refer to receiving data simultaneously upon generation. According to an example embodiment, receiving the photographed video in real-time may refer to receiving the photographed video as soon as the video is photographed by the image sensor. For example, receiving, by the user verification system, the video photographed from the user terminal in real-time may refer to transmitting the video to the user verification system as soon as the video is photographed by the user terminal, and receiving the video photographed from the user terminal by the user verification system. In an example, when transmitting from the user terminal to the user verification system, a video photographing/processing time at the user terminal and/or a communication delay in providing from the user terminal to the user verification system may occur, but a video received after the video photographing/processing time and/or any communication delay time may also be regarded as being received in real-time.

In the present disclosure, "ID card" may refer to a document or card proving identity or personal information of an individual or a user. For example, the ID card may include a resident registration card, a social security card, a driver's license, a passport, a student ID, a disability card, and the like, but is not limited thereto.

In the present disclosure, "similar" may encompass sameness and similarity. For example, the similarity of two pieces of information may refer to that the two pieces of information are the same as or similar to each other.

In the present disclosure, "channel" may refer to a path through which any information and/or data between two devices is communicated with each other. For example, a channel used for communication between the user verification system and the user terminal may refer to a path through which any information and/or data between the user verification system and the user terminal is communicated with each other.

In the present disclosure, "user" and "user terminal" are used separately, but the user may refer to the user terminal, and vice versa.

FIG. 1 is an example diagram illustrating a photographed video of a user performing an action according to a received instruction, in a process of verifying a user according to an example embodiment. The user 120 may receive, through the user terminal 100, a request to verify the identity or real name of the user 120 for the service he or she is using. In an example, the service may include any service that the user terminal 100 can perform through a web browser and/or application, and may include, for example, a pay service, a credit card service, a bank service, a virtual currency service, and the like, but is not limited thereto.

According to an example embodiment, the user 120 may receive the request to verify the user from the user verification system 300 (see FIG. 3) when subscribing to a system that provides the service the user is using, or when his or her ID and/or password is lost. For example, the user verification system 300 may be provided together with the system that provides the service. As another example, the user verification system 300 may be provided separately from the system that provides the service.

The user verification system 300 may be configured to receive a photographed video of at least a part of the user from the user terminal 100. The video may be acquired or photographed through a camera that is attached to, or connected to the user terminal 100 by wire or wirelessly. According to an example embodiment, the camera 110 may be provided by being attached to a front portion of the user terminal 100. In this case, the camera 110 may photograph an action performed by a user looking at the front portion of the user terminal 100, and the photographed video may be transmitted to the user verification system 300. For example, the user verification system 300 may receive in real-time a photographed video of the action of the user from the user terminal 100.

The user verification system 300 may be configured to receive a photographed video of at least a part of the user from the user terminal 100 and determine presence or absence of the user in the received video. According to an example embodiment, the user verification system 300 may transmit one or more instructions to the user terminal 100, and the transmitted one or more instructions may be output to the user terminal 100. For example, as illustrated, the user terminal 100 may receive an instruction "Please write a letter V" from the user verification system 300, and display the instruction on the display of the user terminal 100. In an example, the received instruction may be displayed in a separate area from the area that displays the photographed video.

In response to the instruction received by the user terminal 100, the user may perform an action guided by the instruction, and the action of the user may be photographed by the camera 110 and transmitted to the user verification system 300. For example, as illustrated, the user 120 may draw a V using his or her right hand according to the instruction "Please write a letter V", and this action may be photographed by the camera 110. The video photographed at the user terminal 100 may be transmitted to the user verification system 300 in real-time. The user verification system 300 may determine presence or absence of the user in the video received from the user terminal 100 in real-time.

Figure 2:
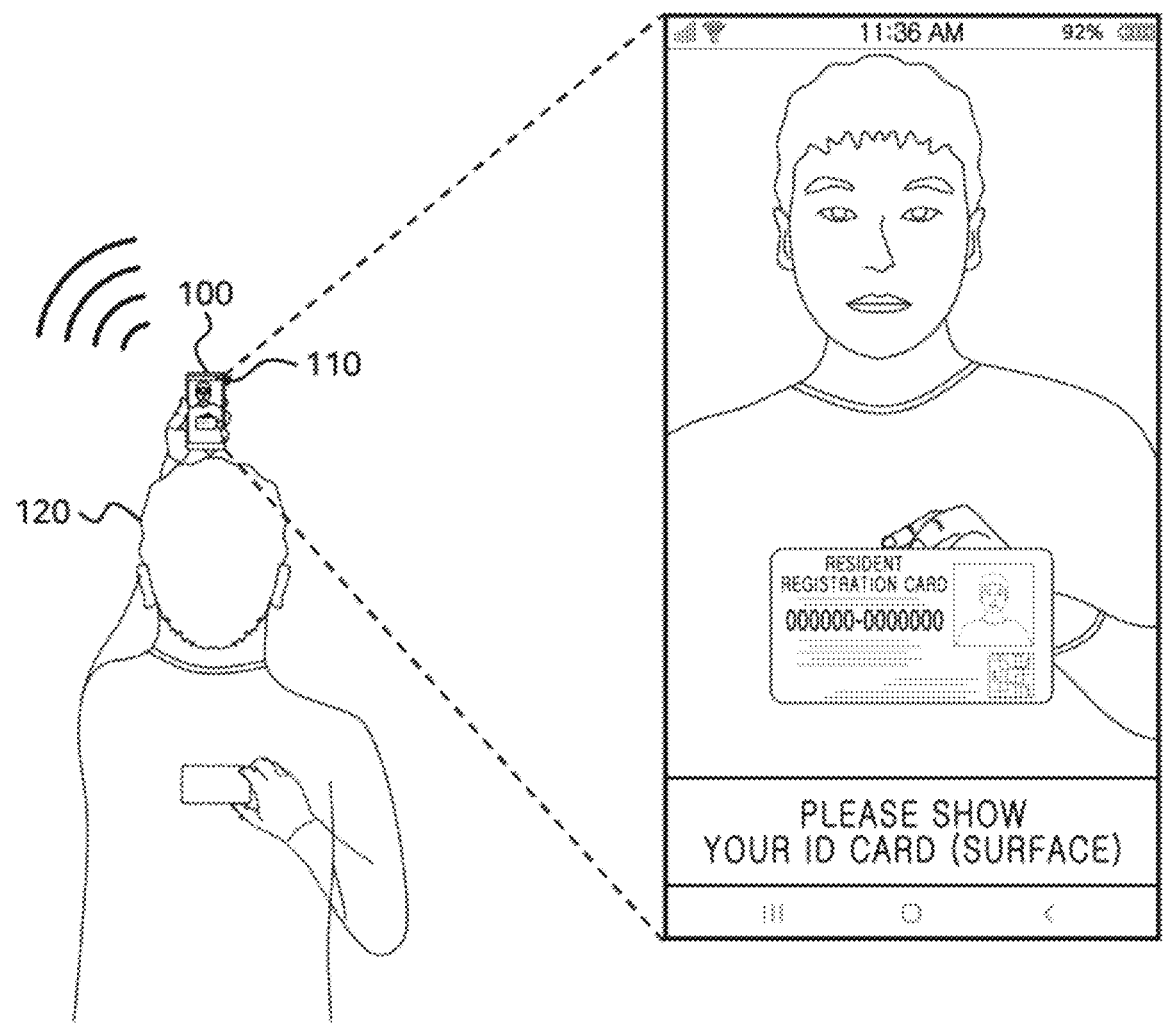
FIG. 2 is an example diagram illustrating a photographed video of a user performing an action according to an instruction displayed on a user terminal, in a process of verifying a user according to another example embodiment.

FIG. 2 is an example diagram illustrating the photographed video of the user 120 performing an action according to the instruction displayed on the user terminal 100, in a process of verifying the user 120 according to another example embodiment. When determining the presence of the user 120, the user verification system 300 may transmit an instruction to the user terminal 100, instructing to present an ID card of the user 120 to be photographed by the camera 110. According to this example embodiment, the user terminal 100 may receive an instruction to show the user's ID card from the user verification system 300 during the process of determining presence or absence of the user. This instruction may be output to the user terminal 100, and for example, as illustrated, it may be displayed on the display of the user terminal 100 as an instruction stating, "Please show your ID card (surface)". In an example, the received instruction may be displayed in a separate area from the area that displays the photographed video.

In response to this instruction, the user 120 may hold the ID card in the hand of the user 120 and show the ID card so that his or her ID card is photographed by the camera 110. The photographed video of the ID card of the user 120 may be transmitted to the user verification system 300. For example, as illustrated, in the process of photographing at least a part of the user 120, the user's ID card may be photographed together. The video may be transmitted to the user verification system 300 as soon as the video is photographed by the camera, that is, in real-time. In this example embodiment, the face of the user 120 and the ID card are illustrated as being photographed together, but the present disclosure is not limited thereto, and only the ID card of the user 120 may be photographed by the camera 110 and provided to the user verification system 300. The user verification system 300 may use the photographed video of the ID card to verify the user 120.

Figure 3:
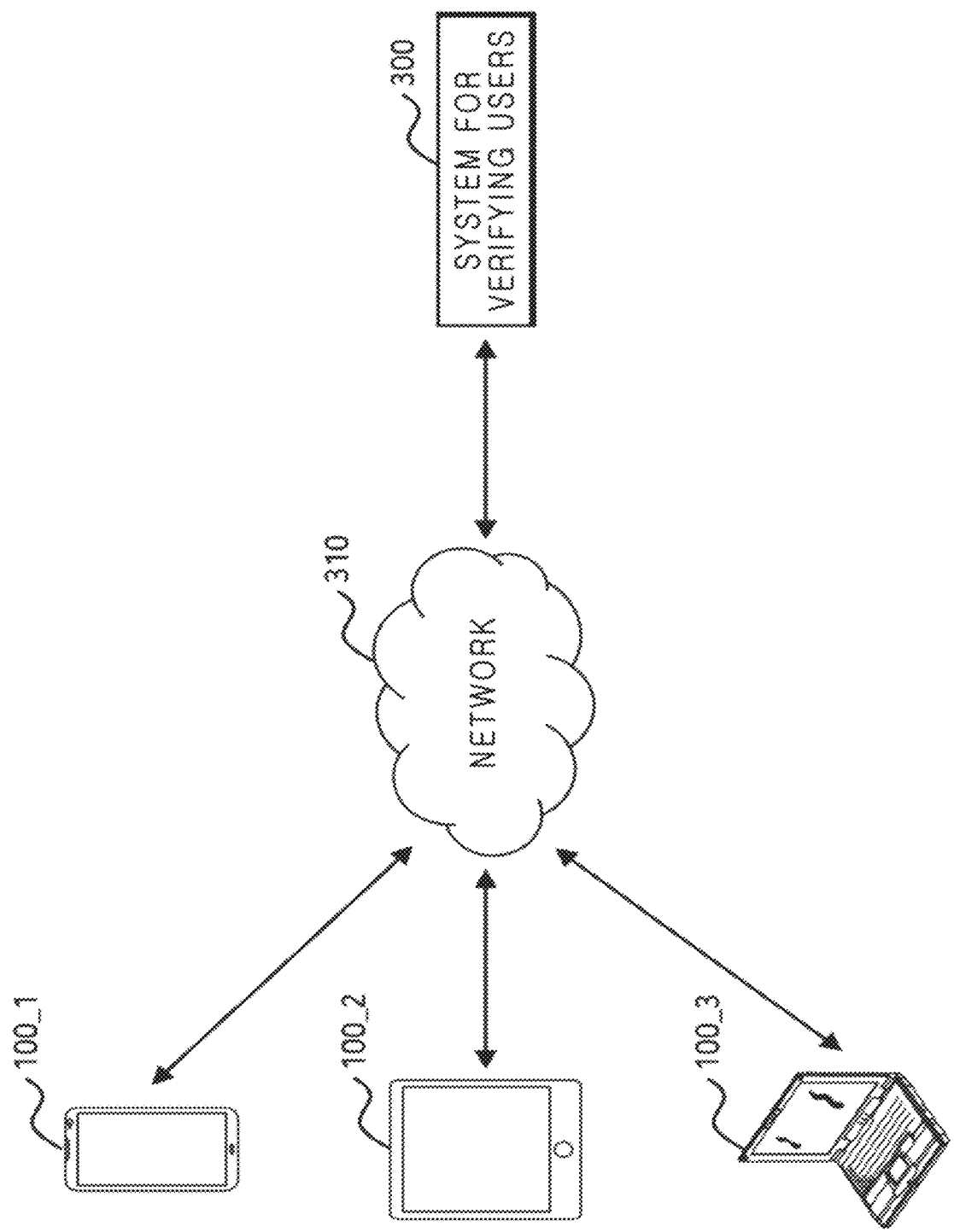
FIG. 3 is a schematic diagram illustrating a configuration in which a user verification system is communicatively connected to a plurality of user terminals in order to provide a user verification service according to an example embodiment.

FIG. 3 is a schematic diagram illustrating a configuration in which the user verification system 300 is communicatively connected to a plurality of user terminals 100_1, 100_2, and 100_3 in order to provide a user verification service according to an example embodiment. The user verification system 300 may include a system capable of verifying users of a plurality of user terminals 100_1, 100_2, and 100_3 to the plurality of user terminals 100_1, 100_2, and 100_3 through a network 310. According to an example embodiment, the user verification system 300 may include one or more server devices and/or databases, or one or more distributed computing devices and/or distributed databases based on cloud computing services that can store, provide, and execute computer-executable programs (e.g., downloadable applications) and data related to user verification services. The user verification service provided by the user verification system 300 may be provided to the user through an application, web browser, or the like that desires a user verification service installed in the plurality of user terminals 100_1, 100_2, and 100_3. In an example, the server that manages such an application may request the user verification system 300 for the user verification, when receiving a user verification request from at least some of the plurality of user terminals 100_1, 100_2, and 100_3. In this case, the user verification system 300 and the plurality of user terminals 100_1, 100_2, and 100_3 may be communicatively connected to each other.

The plurality of user terminals 100_1, 100_2, and 100_3 may communicate with the user verification system 300 through the network 310 for user verification. According to an example embodiment, the plurality of user terminals 100_1, 100_2, and 100_3 may transmit a video associated with the user terminals 100_1, 100_2, and 100_3, which is photographed through the image sensor, to the user verification system 300. In an example, the photographed video may include any information and/or data desired for user verification. For example, the photographed video may include information on at least part of the user (e.g., a face of the user). As another example, the photographed video may include information on the user's ID card.

The plurality of user terminals 100_1, 100_2, and 100_3 may transmit a video photographed by the image sensor to the user verification system 300 in real-time for user verification, through any channel capable of bidirectional communication. According to an example embodiment, the user verification system 300 may receive a video photographed by a plurality of user terminals 100_1, 100_2, and 100_3 through a voice over internet protocol (VoIP) channel with the user terminal 100. According to another embodiment, the video photographed in this way may be received from the user terminal 100 in real-time through a broadcast channel. In an example, the broadcast channel may be generated through any method capable of bidirectional communication, and for example, may be generated using web real-time communication (WebRTC) or the like, but not limited thereto.

The network 310 may be configured to enable communication between the plurality of user terminals 100_1, 100_2, and 100_3 and the user verification system 300. The network 310 may be configured as a wired network such as Ethernet, a wired home network (Power Line Communication), a telephone line communication device and RS-serial communication, a wireless network such as a mobile communication network, a wireless LAN (WLAN), Wi-Fi, Bluetooth, and ZigBee, or a combination thereof, depending on the installation environment. In other words, the method of communication is not limited, and may include a communication method using a communication network (e.g., mobile communication network, wired Internet, wireless Internet, broadcasting network, or satellite network) that may be included in the network 310 as well as short-range wireless communication between user terminals. For example, the network 310 may include any one or more of networks including a personal area network (PAN), a local area network (LAN), a campus area network (CAN), a metropolitan area network (MAN), a wide area network (WAN), a broadband network (BBN), or the Internet. Further, the network 310 may include any one or more of network topologies including a bus network, a star network, a ring network, a mesh network, a star-bus network, or a tree or hierarchical network, but is not limited thereto.

In FIG. 3, a mobile phone terminal 100_1, a tablet terminal 100_2, and a PC terminal 100_3 are illustrated as examples of the user terminals, but the present disclosure is not limited thereto. According to some example embodiments, the user terminal may be any computing device capable of wired and/or wireless communication and having a user interface capable of receiving information on user verification from the user. For example, the user terminal may include a smart phone, a mobile phone, a navigation system, a computer, a notebook computer, a digital broadcasting terminal, a personal digital assistant (PDA), a portable multimedia player (PMP), a tablet PC, a game console, a wearable device, an internet of things (IoT) device, a virtual reality (VR) device, an augmented reality (AR) device, and the like. Although FIG. 3 shows that three user terminals 100_1, 100_2, and 100_3 communicate with the user verification system 300 through the network 310, the present disclosure is not limited thereto, and a different number of user terminals may be configured to communicate with the user verification system 300 through the network 310.

The user verification system 300 may receive a user verification request from the plurality of user terminals 100_1, 100_2, and 100_3 through the network 310. The received user verification request may be stored as user verification information, in a storage medium associated with the user verification system 300. The user verification request may include user information that generated the user verification request, a photographed video of at least part of the user, a photographed video of the user's ID card, and the like, and may be requested when the user wishes to verify himself/herself for a specific service or product.

The user verification system 300 may transmit a plurality of instructions that guide users of the plurality of user terminals 100_1, 100_2, and 100_3 to perform a plurality of actions, to the user terminals 100_1, 100_2, and 100_3 through the network 310. According to an example embodiment, the plurality of instructions may be transmitted to a plurality of user terminals 100_1, 100_2, and 100_3 in real-time. In response to each of the plurality of instructions, the users of the plurality of user terminals 100_1, 100_2, and 100_3 perform an action indicated by the instruction, and a photographed video of the action being performed may be transmitted to the user verification system 300 in real-time. The received video may be used to verify the users of the plurality of user terminals 100_1, 100_2, and 100_3.

Figure 4:
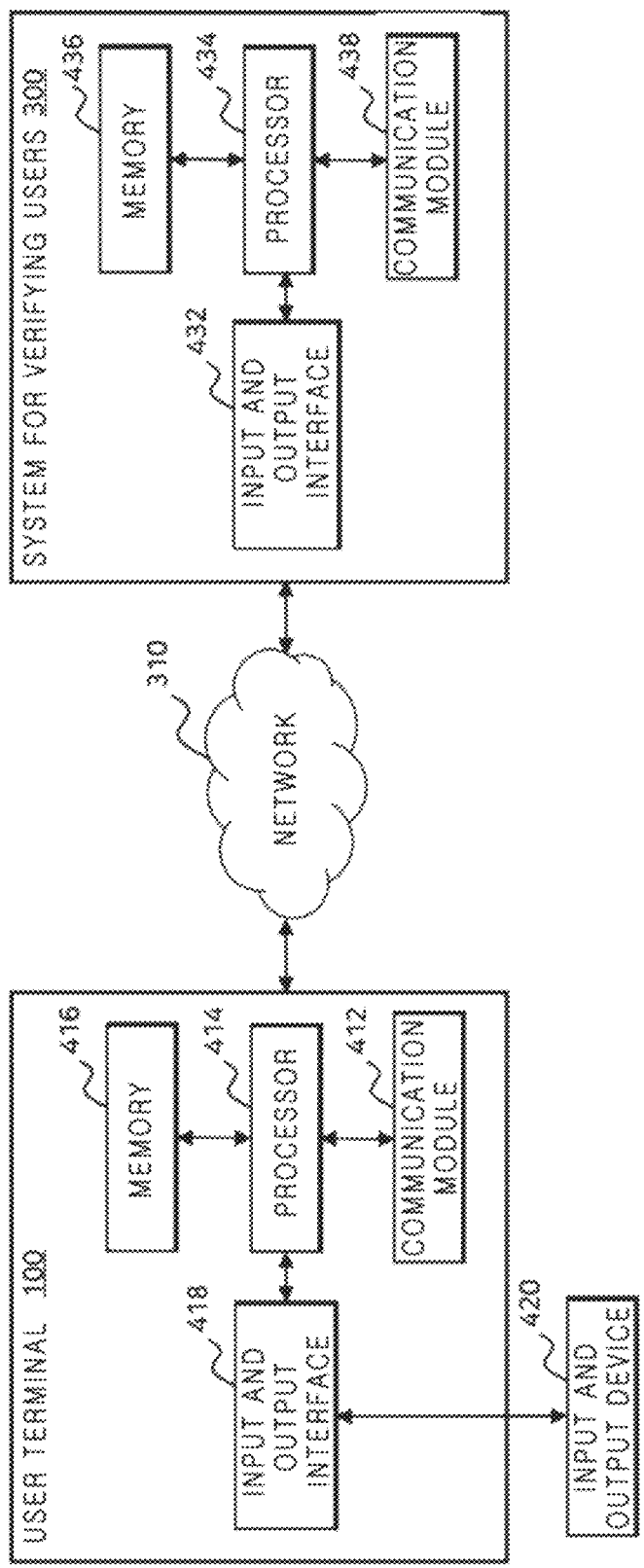
FIG. 4 is a block diagram illustrating an internal configuration of a user terminal and an user verification system according to an example embodiment.

FIG. 4 is a block diagram illustrating the internal configuration of the user terminal 100 and a user verification system 300 according to an example embodiment. The user terminal 100 may include a communication module 412, a processor 414, a memory 416 and an input and output interface 418. Likewise, the user verification system 300 may include an input and output interface 432, a processor 434, a memory 436, and a communication module 438. As illustrated in FIG. 4, the user terminal 100 and the user verification system 300 may be configured to communicate information and/or data through the network 310 using respective communication modules 412 and 438. In addition, the input and output device 420 may be configured to input information and/or data to the user terminal 100 or to output information and/or data generated from the user terminal 100 through the input and output interface 418. In FIG. 4, while the communication module 412, the processor 414, the memory 416, and the input and output interface 418 are illustrated as the internal configurations of the user terminal 100, other user terminals (e.g., user terminals 100_1, 100_2, 100_3 of FIG. 3) may also include an internal configuration identical or similar to the internal configuration of the user terminal 100

The communication modules 412 and 438 may provide a configuration or function for the user terminal 100 and the user verification system 300 to communicate with each other through the network 310, and the user terminal 100 and/or the user verification system 300 may provide a configuration or function for communicating with another user terminal or other system (e.g., separate cloud system, separate video receiving system). For example, a request (e.g., user verification request) generated by the processor 414 of the user terminal 100 according to a program code stored in a recording device such as the memory 416 may be transmitted to the user verification system 300 through the network 310 under the control of the communication module 412. Conversely, control signals or commands (e.g., instruction that guides the user to perform an action) provided under the control of the processor 434 of the user verification system 300 may be received to the user terminal 100 through the communication module 412 of the user terminal 100 via the communication module 438 and the network 310. For example, the user terminal 100 may receive at least one of instruction that guides the user to perform an action or information on an example image that represents this instruction, from the user verification system 300 through the communication module 412. According to this example embodiment, the communication modules 412 and 438 are provided separately from the processors 414 and 434, respectively, and are configured to operate in conjunction with the processors 414 and 434, respectively. Thus, the processors 434 is configured to cause the user verification system 300 to transmit a plurality of instructions that guide a user to perform a plurality of actions to a user terminal 100, and to receive a video photographed in response to the plurality of instructions from the user terminal 100. In some example embodiments, the communication modules 412 and 438 may be included in the processors 414 and 434, respectively, as functional units thereof. Thus, the processors 434 may be configured to transmit a plurality of instructions that guide a user to perform a plurality of actions to a user terminal 100, and configured to receive a video photographed in response to the plurality of instructions from the user terminal 100.

The memories 416 and 436 may include any non-transitory computer-readable recording medium. According to an example embodiment, the memories 416 and 436 may include a permanent mass storage device such as random access memory (RAM), read only memory (ROM), disk drive, solid-state drive (SSD), or flash memory. As another example, the permanent mass storage device such as ROM, SSD, flash memory, or disk drive is a separate permanent storage device that is distinguished from the memories 416 and 436 and may be included in the user terminal 100 or the user verification system 300. Further, the memories 416 and 436 may store an operating system and at least one program code (e.g., a code for a browser installed and driven in the user terminal 100, an application dedicated to user verification installed on the user terminal 100 to provide user verification service, or an application that provides user verification services). In some example embodiments, program codes for user verification provided through a web browser may be stored in the memories 416 and 436.

These software components may be loaded from a computer-readable recording medium separate from the memories 416 and 436. Such a separate computer-readable recording medium may include a recording medium directly connectable to the user terminal 100 and the user verification system 300, and may include a computer-readable recording medium such as a floppy drive, a disk, a tape, a DVD/CD-ROM drive, or a memory card. As another example, the software components may be loaded into the memories 416 and 436 through the communication modules 412 and 438 rather than the computer-readable recording medium. For example, at least one program may be loaded into the memories 416 and 436 based on a computer program (e.g., an application dedicated to user verification or an application that provides user verification services described above) installed by files provided by developers or a file distribution system that distributes the installation files of an application through the network 310. In some example embodiments, at least one program may be loaded into the memories 416 and 436 through a web browser.

The processors 414 and 434 may be configured to process a command of a computer program by performing basic arithmetic, logic, and input and output operations. The command may be provided to the processors 414 and 434 from the memories 416 and 436 or the communication modules 412 and 438. For example, the processors 414 and 434 may be configured to execute the received command according to program code stored in a recording device such as memories 416 and 436.

The input and output interface 418 may be a means for interfacing with the input and output device 420. As an example, the input device may include a device such as a camera including an image sensor, a keyboard, a microphone, a mouse, and so on, and the output device may include a device such as a display, a speaker, or a haptic feedback device. As another example, the input and output interface 418 may be a means for interfacing with a device such as a touch screen or the like that integrates a configuration or a function for performing inputting and outputting. For example, when the processor 414 of the user terminal 100 processes command of the computer program loaded in the memory 416, a service screen or content configured using the information and/or data provided by the user verification system 300 or other user terminals may be displayed on the display through the input and output interface 418. While FIG. 4 illustrates that the input and output device 420 is not included in the user terminal 100, the present disclosure is not limited thereto, and the input and output device 420 may be configured as one device with the user terminal 100. Further, the input and output interface 432 of the user verification system 300 may be a means for interface with a device (not shown) connected to or included in the user verification system 300 for inputting or outputting. In FIG. 4, the input and output interfaces 418 and 432 are illustrated as the components configured separately from the processors 414 and 434, but are not limited thereto, and the input and output interfaces 418 and 432 may be configured to be included in the processors 414 and 434.

The user terminal 100 and the user verification system 300 may include more components than those components shown in FIG. 4. Meanwhile, it would be unnecessary to illustrate such additional components. According to an example embodiment, the user terminal 100 may be implemented to include at least some of the input and output devices described above. Further, the user terminal 100 may further include other components such as a transceiver, a global positioning system (GPS) module, one or more cameras including an image sensor, various sensors, and/or a database. For example, when the user terminal 100 is a smartphone, it may generally include components included in the smartphone. For example, it may be implemented such that various components such as an acceleration sensor or a gyro sensor, a camera module, various physical buttons, buttons using a touch panel, input/output ports, and/or a vibrator for vibration are further included in the user terminal 100.

According to an example embodiment, the processor 414 of the user terminal 100 may be configured to operate an application or a web browser that provides a user verification service. In this case, a program code related with the application or web browser may be loaded into the memory 416 of the user terminal 100. While the application or the web browser is running, the processor 414 of the user terminal 100 may receive information and/or data provided from the input and output device 420 through the input and output interface 418 or receive information and/or data from the user verification system 300 through the communication module 412, and process the received information and/or data and store processing results in the memory 416. Further, such information and/or data may be provided to the user verification system 300 through the communication module 412.

According to an example embodiment, while an application or web browser providing a user verification service is running, the processor 414 may receive information such as texts and images through an input device such as a camera, a touch screen, a keyboard connected to the input and output interface, and so on. Further, the processor 414 may store the received images, videos, and/or texts in the memory 416, and provide these to the user verification system 300 through the communication module 412 and the network 310. For example, the processor 414 may receive information for generating a user verification request through the input device such as the touch screen or the keyboard. Further, the processor 414 may receive, through the input device such as the camera, information on a photographed video of the user performing an action. The received information may be provided to the user verification system 300 through the communication module 412 and the network 310.

The processor 414 may be configured to output the processed information and/or data through an output device such as a device capable of outputting a display (e.g., touch screens or displays) of the user terminal 100 or a device capable of outputting an audio (e.g., a speaker). According to an example embodiment, the information and/or data (e.g., an instruction that guides the user to perform an action or an example image representing this action) provided by the application or web browser that provides the user verification service may be displayed through a device capable of outputting a display or the like. According to another example embodiment, the information and/or data provided by the application or web browser that provides the user verification service may be output through a device capable of outputting an audio or the like. For example, an instruction that guides the user to perform an action may be output through a speaker of the user terminal and provided to the user.

The processor 434 of the user verification system 300 may be configured to generate any information and/or data desired for user verification. According to an example embodiment, the processor 434 may generate information and/or data (e.g., information on a channel with a user terminal) desired for communication with the user terminal requesting user verification. According to another example embodiment, the processor 434 may be configured to generate information and/or data for a plurality of instructions that guide the user to perform a specific action. The generated information and/or data may be stored in the memory 436, and further may be provided to the user terminal 100 through the communication module 438 and the network 310.

The processor 434 may be configured to manage, process, and/or store information and/or data received from a plurality of user terminals including the user terminal 100 and/or a plurality of external systems. The processor 434 may be configured to receive, in real-time, a video photographed through an image sensor from a plurality of user terminals. The video received in real-time may be received seamlessly, that is, continuously. In an example, the video may refer to at least a photographed video of the user performing an action. For example, when communication with the user terminal is cut off and real-time reception of the photographed video is stopped, the processor 434 may terminate the user verification or initiate a new user verification after communication is resumed.

The processor 434 may be configured to analyze the received real-time video and determine presence or absence of the user in the received video. When the user is present, the processor 434 may analyze the face of the user extracted from the video, and verify the user based on the analyzed result. For example, the processor 434 may extract information on the face of the user from a face-related video photographed in response to the instruction that guides to have the face of the user photographed, and extract information on the face of the user from an ID card-related video photographed in response to the instruction that guides to have the user's ID card photographed. The information on the two extracted user faces may be compared, and if similar, the user may be verified. The result of verification of the user may be provided to the user terminal 100 through the communication module 438 and the network 310. Hereinafter, a specific method for providing a user verification service based on received video, by the processor 434 of the user verification system 300, will be described in detail.

Figure 5:
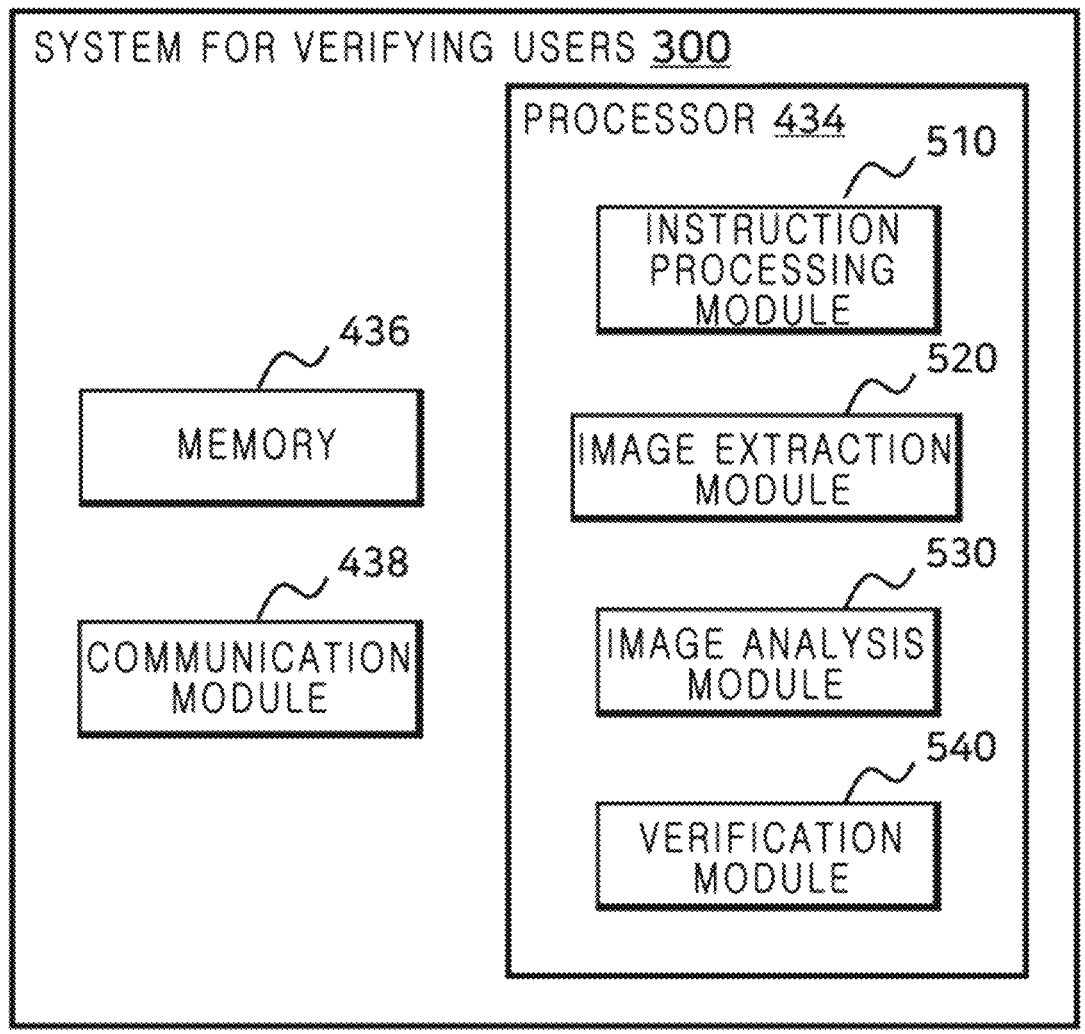
FIG. 5 is a block diagram illustrating a configuration of a user verification system according to an example embodiment.

FIG. 5 is a block diagram illustrating a configuration of the user verification system 300 according to an example embodiment. The processor 434 of the user verification system 300 may be configured to include an instruction processing module 510, an image extraction module 520, an image analysis module 530, and a verification module 540. The processor 434 may transmit and receive information and/or data to and from an external system through the communication module 438. The processor 434 may store information and/or data in the memory 436 or obtain information and/or data from the memory 436.

The instruction processing module 510 may be configured to generate a plurality of instructions for user verification. In an example, each of the plurality of instructions may include an instruction that guides the user to perform an action. Further, each of the plurality of instructions may include an example image representing such an action. For example, the plurality of instructions may include any instruction used to determine presence or absence of the user. As another example, the plurality of instructions may include an instruction that guides to show a user's ID card. The generated instruction may be stored in a storage medium (e.g., memory 436) accessible by the processor 434.

The instruction processing module 510 may select one or more instructions from among a plurality of pre-stored instructions. According to an example embodiment, the instruction processing module 510 may be configured to randomly select a plurality of instructions from among a plurality of pre-stored instruction candidates. For example, the plurality of selected instructions may include the instruction that guides to have the user's front face photographed. As another example, the plurality of selected instructions may include the instruction guiding to have the user's ID card photographed.

The instruction processing module 510 may transmit the plurality of selected instructions to the user terminal 100 through the communication module 438. According to an example embodiment, the instruction processing module 510 may transmit the plurality of selected instructions to the user terminal 100 in a desired (or alternatively, predetermined) order. For example, when the plurality of instructions include a first instruction, a second instruction, and a third instruction, the first instruction may be first transmitted to the user terminal 100. Then, when the analysis of the first instruction is completed by the image analysis module 530, the second instruction may be transmitted to the user terminal 100. When the analysis of the video received in response to the second instruction is completed, the instruction processing module 510 may transmit the third instruction to the user terminal 100. According to another example embodiment, in the case of a specific instruction, the instruction processing module 510 may provide the user terminal 100 with information on a plurality of channels through which videos photographed from a plurality of areas on the screen of the user terminal are to be transmitted, respectively. For example, an area in which the user is photographed and an area in which the ID card is photographed may be separated, and videos photographed from these two areas may be transmitted through different channels.

The instruction processing module 510 may transmit a plurality of instructions to the user terminal 100 until user verification is completed. According to an example embodiment, the plurality of instructions may include an instruction used to determine presence or absence of the user in the photographed video. For example, such instruction may include an instruction that guides a user to perform a specific action with his or her body (e.g., face) and/or object (e.g., ID card). According to another example embodiment, the plurality of instructions may include an instruction used to verify the user in the photographed video. For example, such instructions may include an instruction that guides to have the face of the user properly photographed (e.g., instruction that guides to have the user's front face photographed) and an instruction guiding to have the user's ID card photographed.

The image extraction module 520 may receive the video from the user terminal 100 through the communication module 438 in real-time. When the user terminal 100 receives the instruction that guides the user to perform a specific action from the instruction processing module 510, the user of the user terminal 100 may perform the action. While the action is being performed, a camera associated with the user terminal 100 may photograph the action of the user, and the user terminal 100 may transmit a video photographed in response to the received instruction to the image extraction module 520 through the communication module 438. As soon as the video is photographed, the user terminal 100 may transmit the photographed video to the image extraction module 520 in real-time, and the image extraction module 520 may receive the photographed video in real-time. According to an example embodiment, the image extraction module 520 may directly receive the video through the communication module 438 via the network 310. According to another example embodiment, a video transmitted from the user terminal 100 in real-time may be received by a separate server (e.g., VoIP management server or broadcasting channel management server) that manages a channel between the user verification system 300 and the user terminal 100, and may be provided to the image extraction module 520 through a separate server. According to another example embodiment, the image extraction module 520 may receive a video photographed from a plurality of areas of the screen of the user terminal through a plurality of channels.

The image extraction module 520 may extract one or more images for user verification from the video received in real-time. According to an example embodiment, the image extraction module 520 may be configured to extract one or more images included in the received video according to a desired (or alternatively, predetermined) rule. For example, the image extraction module 520 may be configured to extract a plurality of images included in the received video according to a desired (or alternatively, predetermined) time interval (e.g., extracted every 1 second). According to another example embodiment, the image extraction module 520 may receive information on the instruction that is transmitted from the instruction processing module 510 to the user, and adjust a rate of extracting the image from the received video according to the received instruction. For example, in the case of an instruction that guides the user to perform an action corresponding to the user's static state (e.g., an action to face forward and look straight or an action to show an ID card), the instruction processing module 510 may extract an image from the received video at a low image extraction rate. As another example, in the case of an instruction that guides the user to perform an action corresponding to the user's dynamic state (e.g., an action to move a face or an action to move an ID card), the instruction processing module 510 may extract an image from the received video at a high image extraction rate. The extracted image may be provided to the image analysis module 530.

The image extraction module 520 may determine a plurality of resolutions corresponding to the plurality of instructions. In an example, the resolution may refer to a resolution applied when the user terminal 100 photographs with a camera corresponding to the instruction. According to an example embodiment, the resolution may be determined differently for each area in the video being photographed. For example, in the video being photographed, an area in which the user's ID card is to be located may be set to be photographed with high resolution. The determined resolution may be stored in the memory 436 in association with the instruction.

The image extraction module 520 may determine a transmission rate corresponding to each of the plurality of instructions. In this example, the transmission rate may refer to a transmission rate applied when the user terminal 100 transmits a video photographed with the camera to the user verification system 300. For example, the transmission rate may be expressed as the number of frames transmitted per second (fps). The determined transmission rate may be stored in the memory 436 in association with the instruction. According to an example embodiment, the transmission rate may represent a playback speed of the video photographed by the camera of the user terminal 100. The user terminal 100 may transmit the photographed video to the image extraction module 520 according to the playback speed corresponding to the transmission rate.

When transmitting the instruction to the user terminal 100, the instruction processing module 510 may transmit information on the resolution and/or transmission rate associated with the instruction together. Accordingly, in response to the received instruction, the user terminal 100 may photograph with the camera at the received resolution, and provide the photographed video to the user verification system 300 at the received transmission rate. For example, different resolutions may be received for a plurality of areas displayed on the screen of the video being photographed, respectively, and when photographing the video, the user terminal 100 may apply the resolution set for a respective one of the plurality of areas to the camera.

The image analysis module 530 may be configured to receive one or more images extracted from the image extraction module 520 and analyze the extracted images. According to an example embodiment, a library may be stored in the memory 436, which may be used to analyze whether or not the user performs an action guided by each of the plurality of instructions. In this environment, the image analysis module 530 may access the memory 436 and analyze the received image using the pre-stored library. According to another example embodiment, an analysis model may be may be generated and used to determine whether or not the user performs an action guided by the plurality of instructions, and the generated analysis model may be stored in the storage medium (e.g., the memory 436). The image analysis module 530 may analyze the extracted image using this analysis model. This analysis model is described in detail with reference to FIG. 7.

The image analysis module 530 may analyze one or more received images and determine whether the user in the image performs the action corresponding to the plurality of instructions.

According to an example embodiment, when the instruction transmitted to the user terminal 100 is the instruction that guides the user to move part of his or her body and/or an object, the image analysis module 530 may determine whether the user moves according to the transmitted instruction. According to another example embodiment, when the instruction transmitted to the user terminal 100 is the instruction that guides the user to move his or her ID card, the image analysis module 530 may analyze the image extracted from the video received in response to such an instruction and determine whether the ID card is moved. The information on whether or not the user performs the action corresponding to the plurality of instructions may be provided to the verification module 540.

According to an example embodiment, the image analysis module 530 may extract information on the face of the user from the received image. For example, the received image may include an image of the face of the user (e.g., the user's front face), and the image analysis module 530 may extract from such an image the first information on the face of the user. As another example, the received image may include an image acquired from the user's ID card, and the image analysis module 530 may extract the second information on the face of the user from the image acquired from the user's ID card. The extracted first and second information on the user may be provided to the verification module 540.

According to an example embodiment, after one or more instructions are transmitted to the user terminal 100 in a desired (or alternatively, predetermined) order, the image analysis module 530 may analyze the image extracted from the video received corresponding to each of the one or more instructions transmitted from the user terminal 100. For example, the image analysis module 530 may analyze the extracted image and determine whether the user performs the action as guided by the instruction in response to the instruction. Under this configuration, each time the result of analysis corresponding to one instruction is generated, the generated analysis result may be provided to the verification module 540.

The verification module 540 may determine presence or absence of the user in the video received in real-time, based on the analysis result of the image extracted from the image analysis module 530. For example, the analysis result may be received according to the order of instructions transmitted to the user terminal. According to an example embodiment, when determining that the user performed all actions corresponding to one or more instructions (e.g., three instructions) transmitted to the user terminal 100, the verification module 540 may determine that the user is present in the received video. In contrast, when determining that the user has not performed the action corresponding to one or more instructions transmitted to the user terminal, the verification module 540 may determine that the user is not present in the received video.

According to another example embodiment, when determining that the user has not performed the action corresponding to the first instruction among the plurality of instructions transmitted to the user terminal 100, the verification module 540 may request the instruction processing module 510 to transmit a different second instruction to the user terminal 100. In an example, the second instruction may be selected by the instruction processing module 510 based on a difference between the action of the user obtained from the analysis of the video analyzed from the video received in response to the first instruction and the action corresponding to the first instruction. The verification module 540 may determine that the user is present in the received video when the result of analyzing the image extracted from the video photographed in response to the second instruction indicates that the user performed an action corresponding to the second instruction. In another example embodiment, when the verification module 540 receives an analysis result indicating that the user performed an action corresponding to a desired (or alternatively, predetermined) number of instructions among a plurality of instructions, the verification module 540 may determine that the user is present in the received video.

In another example embodiment, when determining that the video received from the user terminal 100 is not continuous, the verification module 540 may determine that the user is not present in the received video. For example, when determining that the time difference between two or more consecutive frames included in the video does not correspond to the transmission rate indicated by the instruction processing module 510, it may be determined that the user is not present in the received video.

In another example embodiment, when determining that the user has not performed the action corresponding to the first instruction among the plurality of instructions transmitted to the user terminal 100, the verification module 540 may instruct the communication module 438 to change a channel used for communication with the user terminal. According to an example embodiment, the verification module 540 may change the channel currently being used for communication with the user terminal 100 to a different communication channel. Accordingly, it is possible to prevent user verification from not proceeding properly due to a problem of the communication channel. According to another example embodiment, the verification module 540 may instruct the communication module 438 to change the channel currently used for communication with the user terminal 100 to a communication channel that can be connected to a counselor. Accordingly, when the action of the user does not correspond to the action indicated by the transmitted instruction, the counselor may directly perform user verification, thereby providing accurate verification for the user.

The verification module 540 may verify the user based on the analysis result of the extracted image. According to an example embodiment, the verification module 540 may be configured to verify the user when it is determined from the received image that the user is present. In another example embodiment, when receiving the video analysis result from the image analysis module 530 indicating the determination that the ID card is moved, the verification module 540 may determine that the ID card is present. Accordingly, it may be configured such that the user can be verified when the ID card is determined to be present.

The verification module 540 may receive the first information on the face of the user extracted from the face-related video photographed in response to an instruction that guides to have the face of the user photographed, and receive the second information on the face of the user extracted from the ID card-related video photographed in response to an instruction that guides to have the user's ID card photographed. Then, the extracted first information on the face of the user and the extracted second information on the face of the user may be compared with each other. In an example, the verification module 540 may verify the user when the extracted first information and the extracted second information are similar to each other. For example, when the similarity between the extracted first information and the extracted second information is equal to or greater than a desired (or alternatively, predetermined) similarity or a reference similarity value, it may be determined that the extracted first information and the extracted second information are similar to each other. As another example, the verification module 540 may determine the similarity between the extracted first information and the extracted second information and a confidence related thereto, and may determine whether the extracted first information and the extracted second information are similar to each other based on the determined similarity and confidence. Such similarity and/or confidence may be determined using any technique known in the image processing field. For example, a rule-based technique configured to infer/output similarity and/or confidence based on information extracted from a plurality of images, machine learning techniques, artificial neural network models, and the like may be used, however, example embodiments are not limited thereto. The user verification result determined by the verification module 540 may be provided to the user terminal 100 or may be provided to a system associated with the user verification request.

FIG. 5 illustrates that the processor 434 includes the instruction processing module 510, the image extraction module 520, the image analysis module 530, and the verification module 540 as respective modules, but the present disclosure is not limited thereto, and two or more modules may be implemented as one module.

Figure 6:
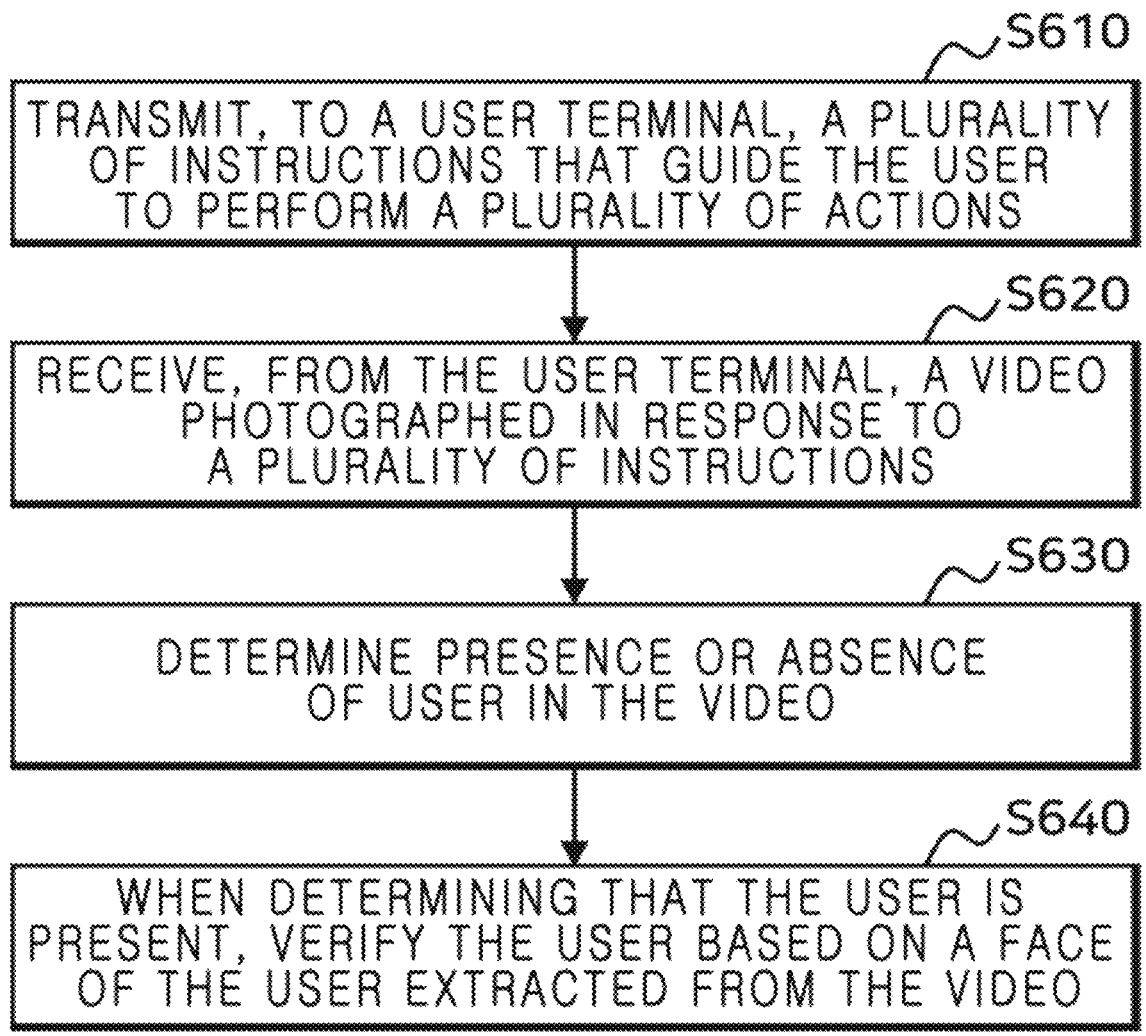
FIG. 6 is a flowchart illustrating a method for verifying users according to an example embodiment.

FIG. 6 is a flowchart illustrating a method 600 for verifying users according to an example embodiment. The method 600 for verifying users may be performed by the user verification system 300. As illustrated, the method 600 for verifying users may begin at S610, by transmitting a plurality of instructions that guide the user to perform a plurality of actions, to the user terminal. For example, the plurality of actions may include an action desired to determine presence or absence of the user, an action desired to extract a face of the user, an action desired to photograph a user's ID card, and the like.

Then, at S620, a video photographed in response to the plurality of instructions may be received from the user terminal. According to an example embodiment, the user verification system 300 may receive the video photographed in response to the plurality of instructions from the user terminal in real-time through a channel for communication with the user terminal. To this end, in response to the plurality of instructions, the user terminal may photograph the action of the user in response to the instruction by using a camera including an image sensor, and transmit the photographed video to the user verification system 300 in real-time.

Next, at S630, the user verification system S630 may determine presence or absence of the user in the video. In the video, an action of the users performed in response to each of the plurality of instructions may be photographed. For example, such an action may refer to an action of moving a part of the user's body (e.g., face, hand or arm) and/or an object (e.g., an object that the user can hold by hand).

Finally, at S640, when determining that the user is present, the user verification system 300 may verify the user based on the face of the user extracted from the video. According to an example embodiment, the user verification system 300 may be configured to extract a plurality of user faces from a video. For example, the first information on the photographed face of the user may be extracted from the video. Further, the second information on the face of the user included in the user's ID card may be extracted from the video. Then, the user verification system 300 may compare the similarity between the extracted first information and the second information on the face of the user, and verify the user when the first information and the second information are similar to each other.

Figure 7:
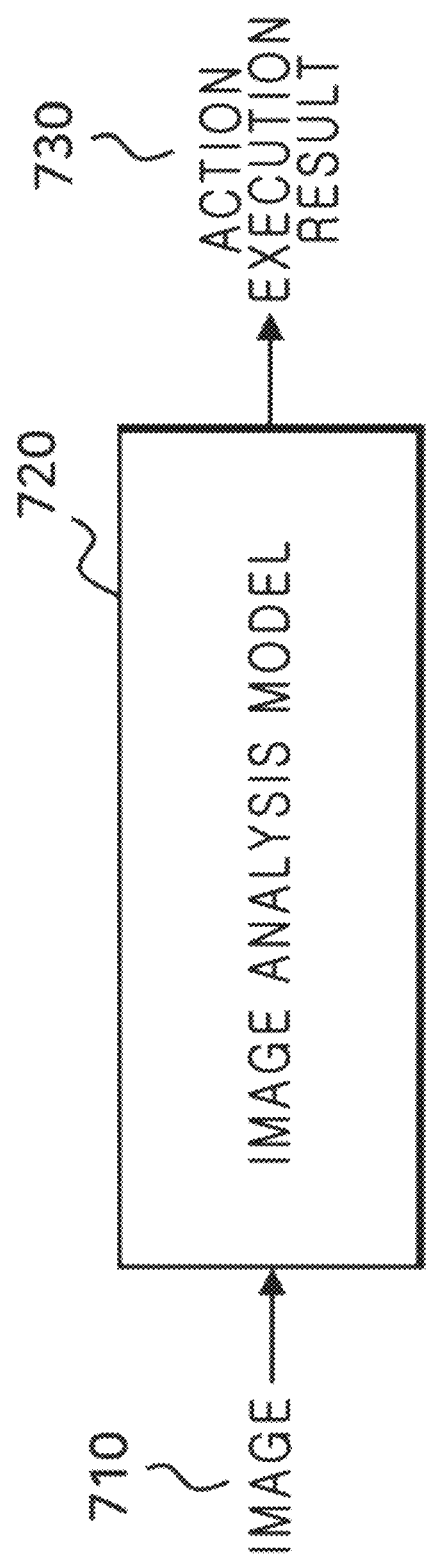
FIG. 7 is a diagram illustrating an image analysis model configured to infer or output a result as to presence or absence of an object based on an input image according to an example embodiment.

FIG. 7 is a diagram illustrating an image analysis model 720 configured to infer or output an action execution result 730 based on an image 710 according to an example embodiment. The image analysis model 720 may be generated through the processor 434 of the user verification system 300, and the generated model 720 may be stored in a storage medium (e.g., memory 436) accessible by the processor 434. The image 710 may include one or more images extracted from the video received by the user verification system 300. For example, the image extraction module 520 may receive a video photographed from the user terminal in real-time and extract the image 710 from the received video according to a desired (or alternatively, predetermined) rule. The extracted image 710 is provided to the image analysis module 530, and the image analysis module 530 may be configured to input the extracted image 710 into the image analysis model 720 to infer or output a result 730 of performing an action by the user. For example, the action execution result may include information on whether or not the user performs the action corresponding to each of the plurality of instructions. In an example, the image analysis model 720 may include a plurality of models for analyzing a plurality of actions represented by a plurality of instructions.

According to an example embodiment, the image analysis module 530 may be configured to provide a plurality of training images, which are the photographed images of a plurality of user performing actions, as input images of the image analysis model 720, to infer or output a result as to whether or not the user performs a specific action in the image. For example, the image analysis model 720 may be configured to infer a result as to whether or not the user performs a specific action through rule-based learning and prediction. As another example, the image analysis model 720 may be configured to be trained through a known machine learning technique, and output the action execution result 730 through the input image. For example, the machine learning technique may include Find-S algorithm, Version Space algorithm, and Candidate Elimination algorithm. As another example, the image analysis model 720 may include an artificial neural network model generated using any neural network or the like.

Figure 8:
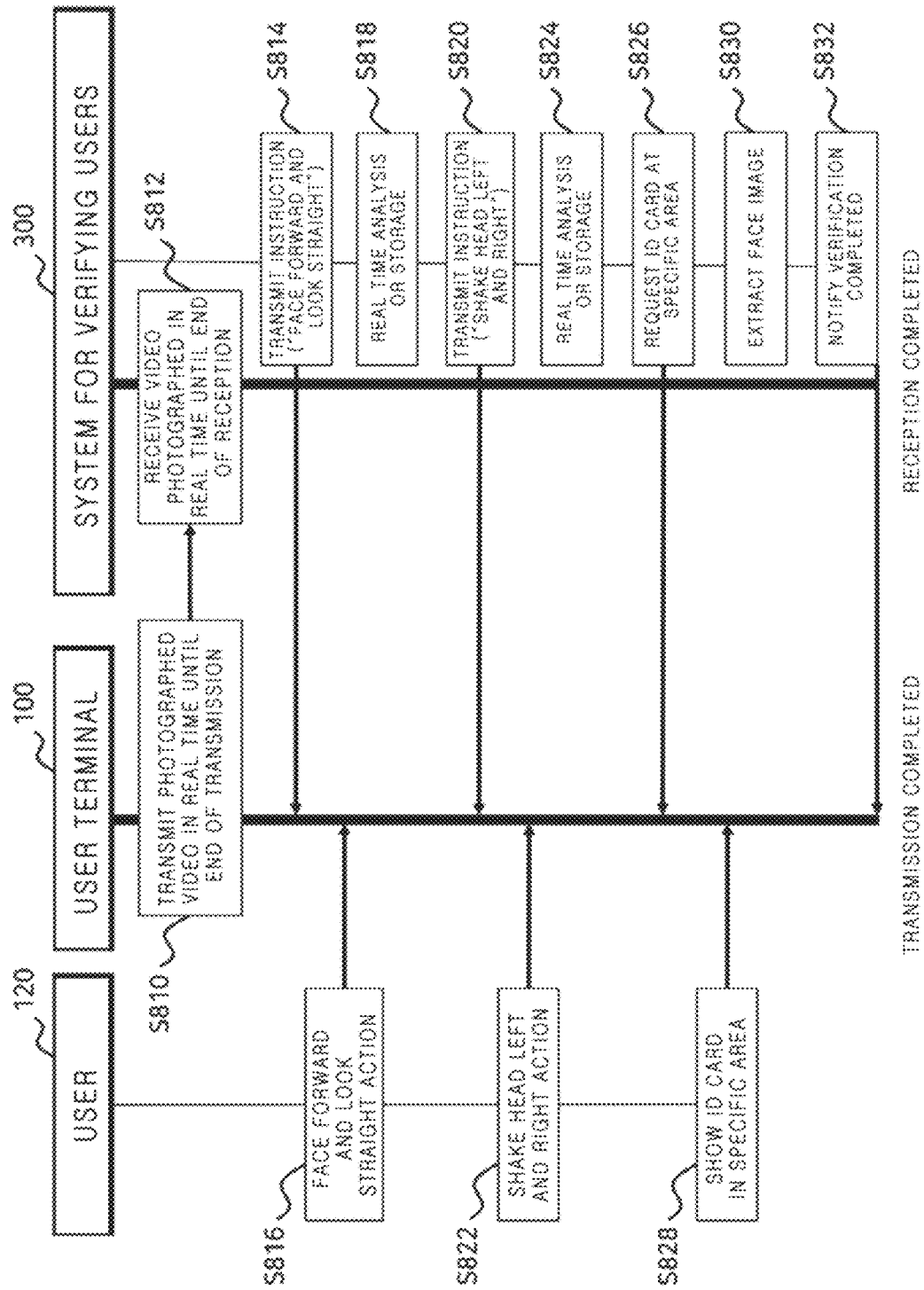
FIG. 8 is a diagram illustrating an example of verifying a user based on a photographed video of the user performing an action according to a plurality of instructions according to an example embodiment.

FIG. 8 is a diagram illustrating an example of verifying a user based on a photographed video of the user performing an action according to a plurality of instructions according to an example embodiment. The user terminal 100 may request user verification through the user verification system 300. In response, the user verification system 300 may create a channel for communication with the user terminal. For example, when the user verification system 300 communicates with the user terminal using an open framework for the web that enables Real-Time Communications (webRTC), the user verification system 300 may transmit information including a link (e.g., a "start user request" button) to the user terminal. In response, the user terminal may create a channel for communication with the user by clicking the button. The user terminal 100 may transmit a video photographed by a camera connected to the user terminal to the user verification system 300 through the generated channel in real-time.

The user terminal 100 may start real-time transmission of the video photographed by the camera, and may transmit the photographed video to the user verification system 300 in real-time until the end of the transmission (S810). The photographed video may be transmitted in real-time through the channel between the user verification system 300 and the user terminal 100. Accordingly, the user verification system 300 may start receiving, in real-time, the video photographed by the user terminal 100, and may receive the video photographed in real-time through the generated channel until the end of the reception (S812). That is, while performing user verification, the user verification system 300 may receive the video photographed by the user terminal 100 in real-time and continuously.

After the reception of the video photographed by the user terminal 100 is started, the user verification system 300 may transmit a plurality of instructions to the user terminal 100 in a desired (or alternatively, predetermined) order. For example, the plurality of instructions may be selected randomly. In response, the user may perform an action corresponding to the plurality of instructions, and the user terminal 100 may transmit the photographed video of the performed action to the user verification system 300 in real-time. The user verification system 300 may analyze the video transmitted in real-time and store the analyzed result. Further, the user verification system 300 may verify the user based on the video stored in real-time and notify the verification result to the user terminal 100.

First, the user verification system 300 may transmit a "face forward and look straight" instruction (S814). In response, the user 120 may perform an action of showing his or her face forward on the screen being photographed through the camera (S816). This action is photographed by the camera, and the user terminal 100 may transmit the photographed video to the user verification system 300 in real-time. The user verification system 300 may analyze the video received in real-time to determine whether the user performed the action as indicated by the transmitted instruction, that is, the face-forward action, and store the analysis result (S818).

Next, the user verification system 300 may transmit a "shake head left and right" instruction to the user terminal 100 (S820). In response, the user 120 may perform an action of shaking his or her head left and right on the screen being photographed through the camera (S822). The user terminal 100 may photograph such an action through the camera, and transmit the photographed video to the user verification system 300 in real-time. The user verification system 300 may analyze the video received in real-time to determine whether or not the user performed the action as indicated by the transmitted instruction, that is, the action of shaking the head left and right, and store the analysis result (S824). In the present disclosure, because the user 120 performed the action as guided by the plurality of instructions in response to the plurality of instructions, the user verification system 300 may determine that the user is present in front of the camera during user verification.

After determining that the user is present, the user verification system 300 may request or transmit an instruction that guides to have the ID card positioned in a specific area for photographing, to the user terminal 100 (S826). For example, the specific area may correspond to a partial area within each image or frame forming the photographed video, and may be displayed through the display of the user terminal. In response, the user may show his or her ID card in the specific area (S828). Such an ID card may be photographed through a camera associated with the user terminal 100, and the photographed video may be transmitted to the user verification system 300 in real-time. The user verification system 300 may extract the face of the user image by analyzing the ID card-related video photographed in response to the instruction to show the ID card in the specific area, and extract a face image of the user from the face-related video photographed in response to the instruction to face forward and look straight (S830). The user verification system 300 may compare the two extracted face images of the user to each other and, when the face images are similar to each other, notify that the user's verification is completed (S832). In response to this notification, the user terminal 100 may stop the real-time transmission of the photographed video. Accordingly, the reception of the photographed video by the user verification system 300 may also be stopped.

FIG. 9 is a diagram illustrating an example instruction information DB 900 according to an example embodiment. The instruction information DB 900 may be constructed as any data structure in which a plurality of instructions, resolutions, transmission rates, and the like are stored in association with each other. In an example, the resolution may be set differently for each area according to the instruction.

The resolution and transmission rate corresponding to the plurality of instructions may be determined by the processor 434, and the determined resolution and transmission rates may be stored in the storage medium (e.g., memory 436) as the instruction information DB 900. According to an example embodiment, a high resolution may be determined and stored for the instruction that guides the extraction of image of the face for use in the user verification. For example, as illustrated, because the photographed face forward video may be received in response to instruction 1, the resolution (e.g., 720p) associated with instruction 1 may be set to be higher than the resolution associated with the other instructions. As another example, a photographed video of a face and an ID card (surface) may be received in response to instruction 5, and the face image in the user's ID card may be used to verify the user. Accordingly, the resolution (e.g., 1024p) of the area 2 in which the user's ID card is to be guided to be photographed, may be set to be higher than a resolution associated with the other instructions (e.g., a resolution associated with the area 1). In this case, the information on the area 1 and/or the area 2 may be stored in the storage medium (e.g., the memory 436) as the instruction information DB 900 or the area information DB.

According to another example embodiment, among the plurality of instructions used to determine presence or absence of the user, the instruction that guides the extraction of image to be used to analyze the action (e.g., movement) of the user may be set to a relatively high resolution. For example, because a photographed video of an action of moving the face to the left may be received in response to instruction 2, the resolution (e.g., 480p) associated with instruction 2 may be set to be higher than a resolution associated with the instruction indicating the user's static movement. Likewise, instruction 4 may be similarly set. In some example embodiments, the instruction indicating the user's static movement may include instruction 3 ("Write a letter V"), for example, and the resolution associated with instruction 3 may be set to a relatively low resolution of 240p.

The processor 434 may determine the transmission rate differently according to a plurality of instructions. According to an example embodiment, the transmission rate may be set to be high for the instruction that guides the extraction of image to be used to analyze the action (e.g., movement) of the user. For example, for instructions 2 and 4, which may result in reception of the photographed video of the action of user's movement, a higher transmission rate (e.g., 5 fps) than the other instructions may be set. According to another example embodiment, a relatively low transmission rate may be set for the instruction associated with the user's static movement. For example, instructions 1, 3, and 5 may be associated with the user's static movement, and as illustrated, the transmission rate may be set to 1 fps.

When transmitting each instruction to the user terminal with reference to the instruction information DB 900 stored in the storage medium, the processor 434 may transmit each instruction together with information on the resolution and/or transmission rate associated with the instruction. In response, the user terminal may apply the received resolution to the camera when photographing a video through the camera in response to the received instruction, and transmit the frames or images of the video photographed at the received transmission rate to the user verification system 300. Because the user terminal transmits the photographed video to the user verification system 300 at different transmission rates depending on the instructions, data usage in the user terminal for user verification may be reduced or minimized. In other words, computing resources of the user terminal desired for photographing, image processing, and/or data transmission in association with a user verification may be appropriately adjusted based on the information on the resolution and/or transmission rate provided from the processor 434 of the user verification system 300.

Figure 10:
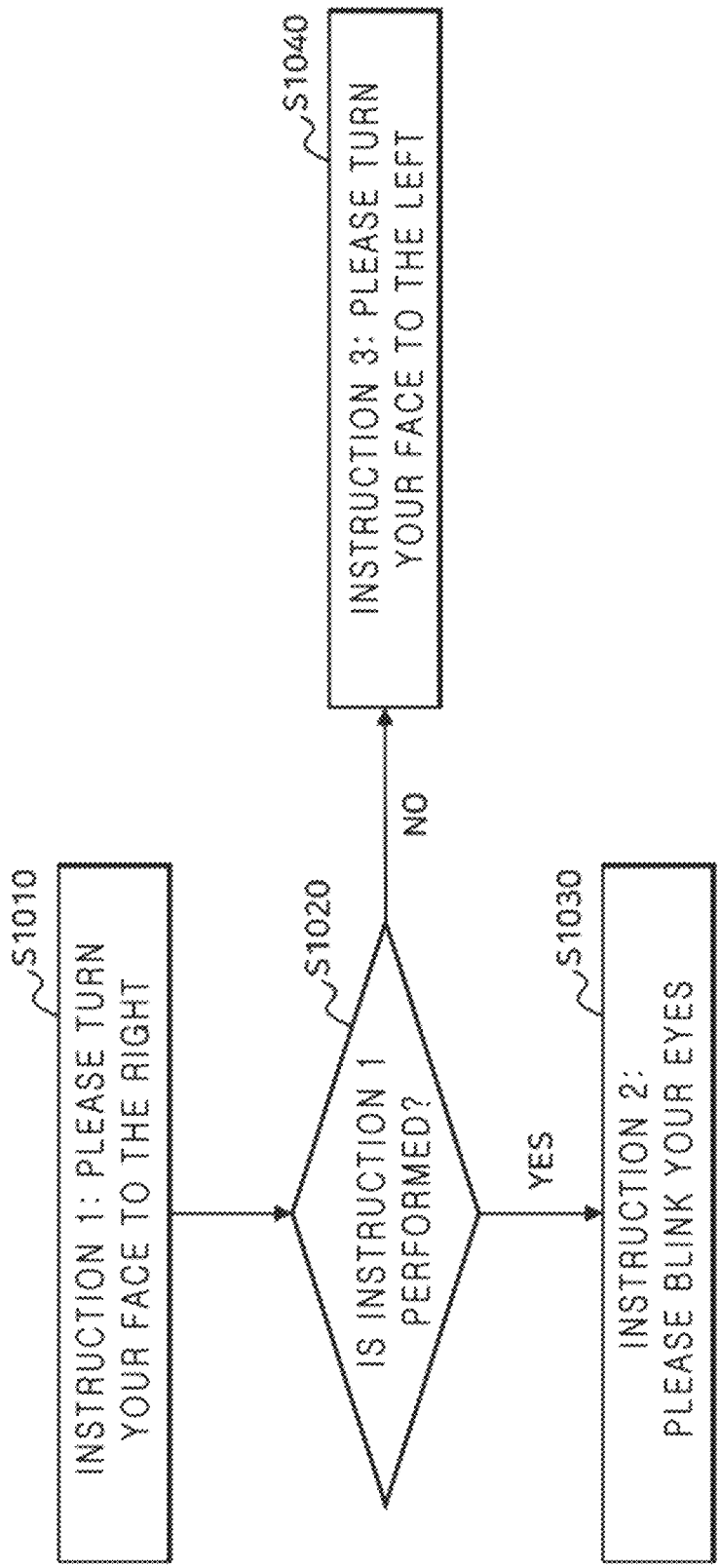
FIG. 10 is a diagram illustrating an example of selecting different instructions by a user verification system according to whether or not the user performs an action, according to an example embodiment.

FIG. 10 is a diagram illustrating an example of selecting different instructions by a user verification system 300 according to whether or not the user performs an action, according to an example embodiment. As illustrated, the user verification system 300 may select instruction 1 ("Please turn your face to the right") (S1010). For example, instruction 1 may be selected by a desired (or alternatively, predetermined) rule. In the process of verifying the user, the selected instruction 1 may be transmitted to the user terminal.

In response to the received instruction 1, the user terminal may photograph the user performing the action with the camera and transmit the photographed action of the user to the user verification system 300. The user verification system 300 may analyze the received video and determine whether the user performs instruction 1 (S1020). When the determination result indicates that the user performs instruction 1, instruction 2 ("Please blink your eyes") may be selected (S1030). In an example, the action indicated by instruction 2 may not be associated with the action indicated by instruction 1.

When determining that the user does not perform instruction 1, instruction 3 ("Please turn your face to the left") may be generated or selected (S1040). In an example, instruction 3 may be selected based on a difference between the action of the user obtained from the analysis of the received video and the action corresponding to instruction 1. For example, the action associated with instruction 3 may represent an action similar to the action associated with instruction 1. Accordingly, when the action of the user in the video photographed in response to instruction 1 is not verified, the action of the user in the video photographed in response to instruction 3 representing the similar action is analyzed, and the analyzed result in response to instruction 1 may be supplemented or verified again.

Although not illustrated in FIG. 10, when the determination result indicates that the user does not perform instruction 1, the verification process may be terminated or it may be requested again to perform instruction 1. In this case, the user verification system 300 may transmit information on the determination that instruction 1 is not performed to the user terminal.

Meanwhile, the user terminal may request a user verification using an application or web browser that provides a user verification service. In response, a channel may be generated between the user terminal and the user verification system that provides the user verification service. The user terminal may communicate with the user verification system using the generated channel. FIGS. 11 to 15 below illustrate example screens for photographing the user performing an action in response to the instructions, in a process of using the user verification service.

Figure 11:
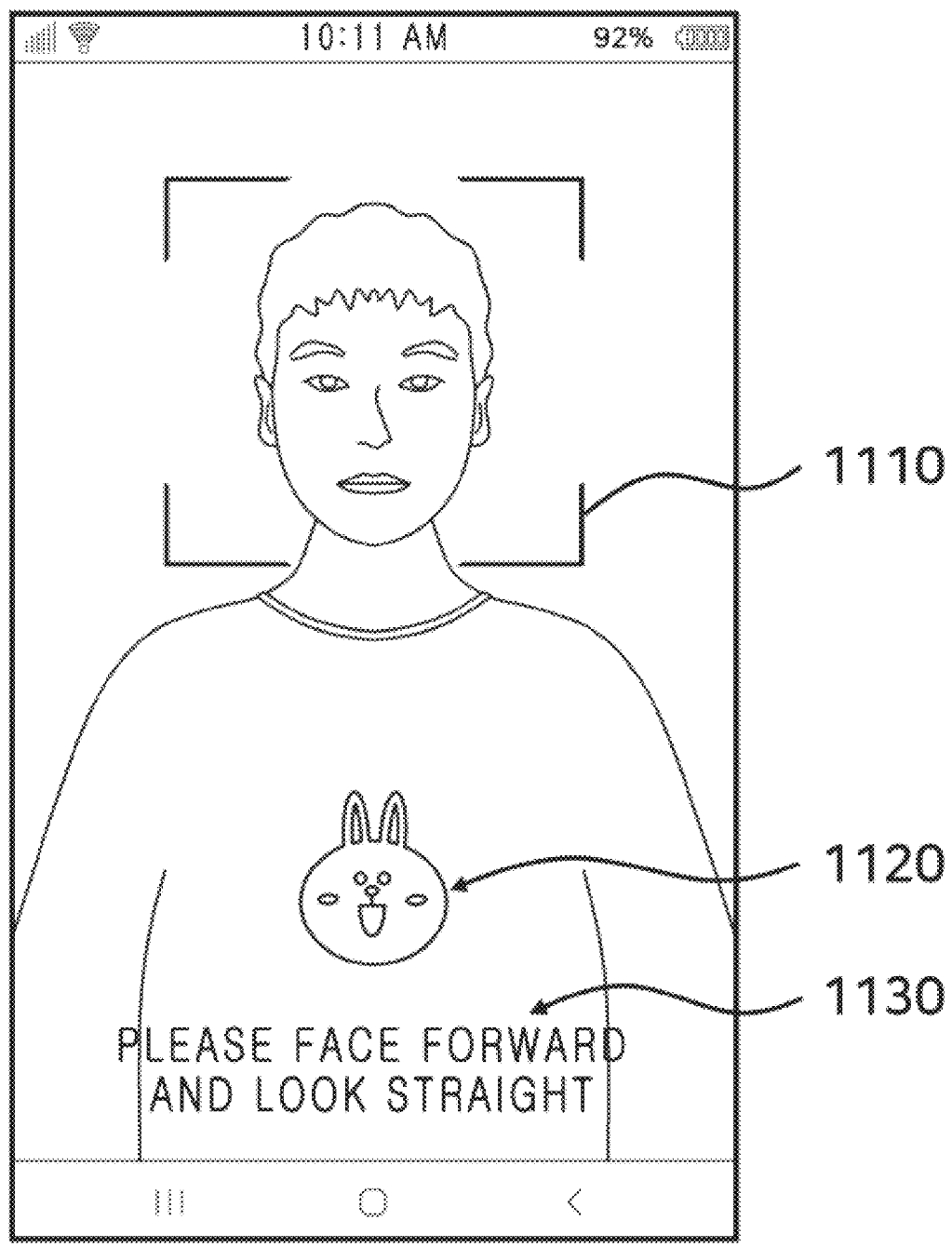
FIG. 11 is a diagram illustrating an example of a screen of photographing the user performing an action in response to an instruction according to an example embodiment.

FIG. 11 is a diagram illustrating an example of a screen of photographing the user performing an action in response to an instruction according to an example embodiment. According to an example embodiment, the user terminal may receive an instruction "Please face forward and look straight" from the user verification system 300. In response to this instruction, the user may act so that his or her face is located in an area 1110 displayed on the screen displaying the video photographed with the camera. When this action is performed, a photographed video of the user's front face may be transmitted to the user verification system 300 in real-time. In response, the user verification system 300 may analyze the video photographed from the partial area 1110 in the video during the user verification process.

As illustrated, in response to the received instruction, information associated with the received instruction may also be displayed on the screen of the user terminal displaying the video being photographed with the camera. According to an example embodiment, a text 1130 representing the received instruction, that is, "Please face forward and look straight" may also be displayed on the screen of the user terminal displaying the video being photographed. Further, a character image 1120 representing the received instruction may also be displayed on the screen of the user terminal. By referring to the text 1130 and/or the character image 1120, the user may perform the action corresponding to the received instruction. The user verification system 300 receiving the photographed video of this action in real-time may determine presence or absence of the user in the video. Further, the user verification system 300 may extract information on the face of the user from the received video.

Figure 12:
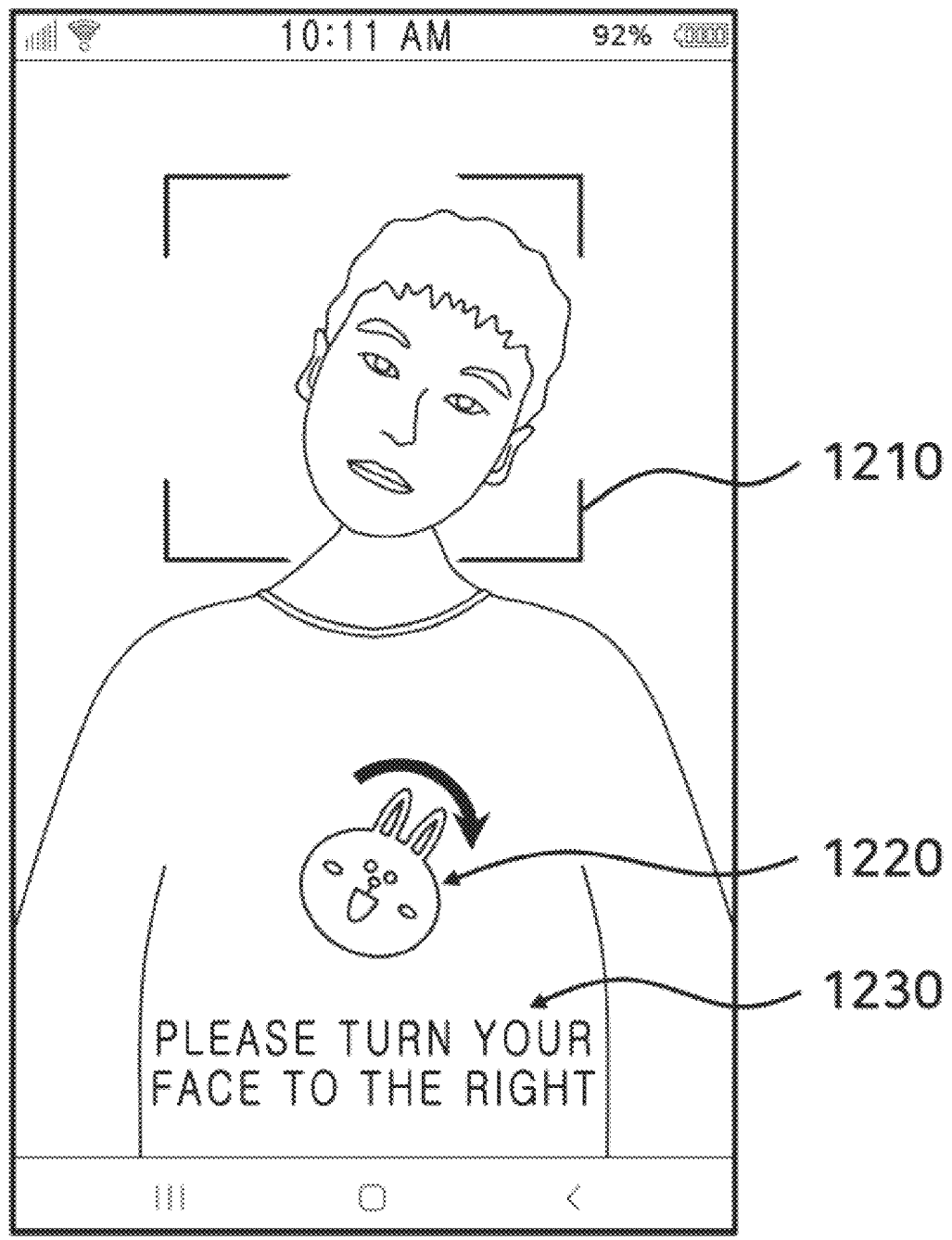
FIG. 12 is a diagram illustrating an example of a screen of photographing the user performing an action in response to an instruction according to another example embodiment.

FIG. 12 is a diagram illustrating an example of a screen of photographing the user performing an action in response to an instruction according to another example embodiment. According to the present example embodiment, the user terminal may receive an instruction "Please turn your face to the right" from the user verification system 300. In response to this instruction, the user may place his or her face in a specific area 1210 displayed on the screen being photographed with the camera, and perform an action of turning his or her face to the right. When this face action is performed, the photographed video of the user performing the action of turning his or her face to the right may be transmitted to the user verification system 300 in real-time. In response, the user verification system 300 may analyze the video photographed from the partial area 1210 in the video during the user verification process.

As illustrated, in response to the received instruction, information associated with the received instruction may also be displayed on the screen of the user terminal displaying the video being photographed with the camera. According to an example embodiment, a text 1230 representing the received instruction, that is, "Please turn your face to the right" may also be displayed on the screen of the user terminal displaying the video being photographed. Further, a character image 1220 representing the received instruction may also be displayed on the screen of the user terminal. By referring to the text 1230 and/or the character image 1220, the user may perform the action corresponding to the received instruction, and the user verification system 300 receiving the photographed video of this action in real-time may determine presence or absence of the user in the video.

Figure 13:
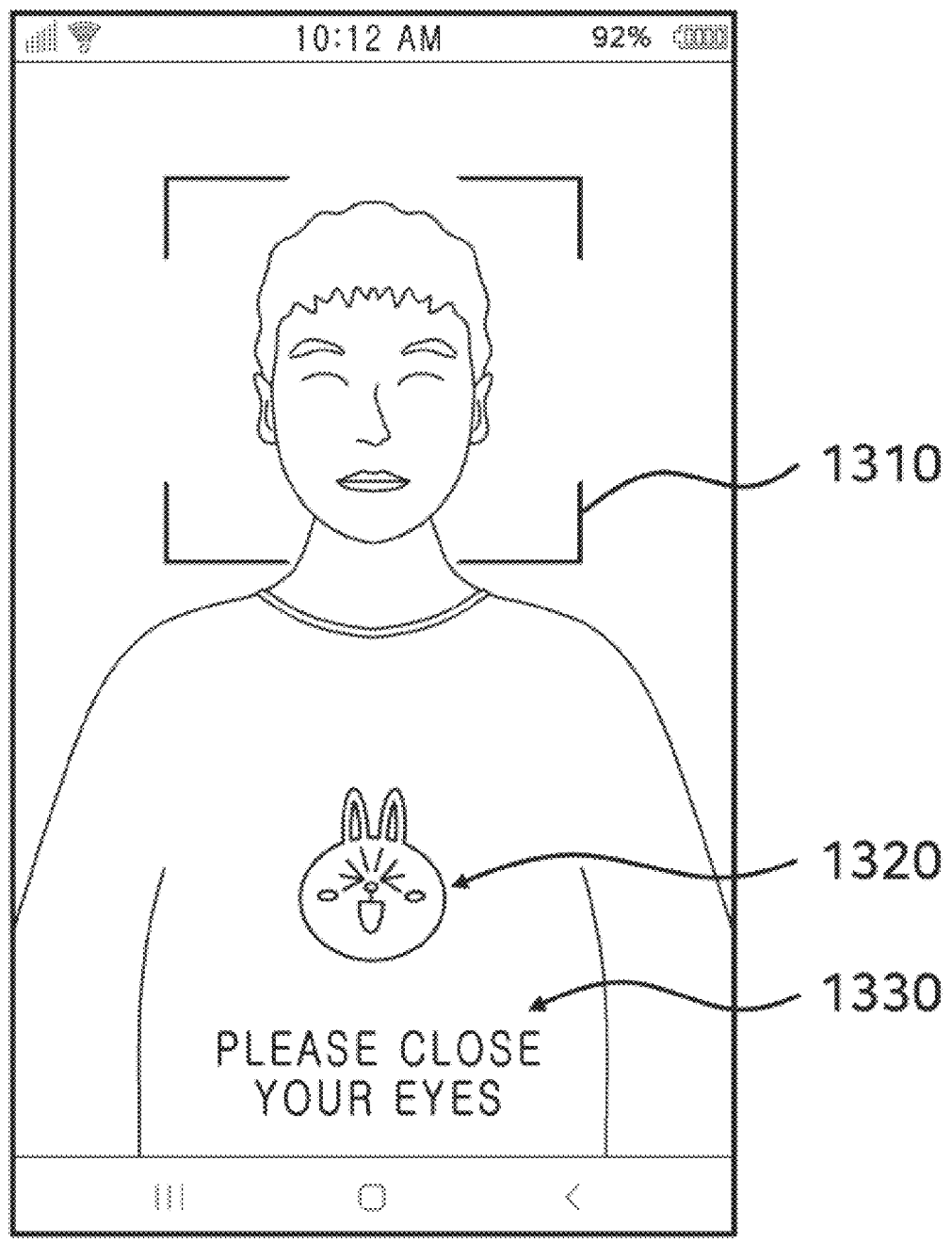
FIG. 13 is a diagram illustrating an example of a screen of photographing the user performing an action in response to an instruction according to yet another example embodiment.

FIG. 13 is a diagram illustrating an example of a screen of photographing the user performing an action in response to an instruction according to yet another example embodiment. According to the present example embodiment, the user terminal may receive an instruction "Please close your eyes" from the user verification system 300. In response to this instruction, the user may place his or her face in the area 1310 displayed on the screen being photographed with the camera, and perform the action of closing his or her eyes. When this action is performed, a photographed video of the user closing his or her eyes may be transmitted in real-time to the user verification system. In response, the user verification system 300 may analyze the video photographed from the partial area 1310 in the video during the user verification process.

In FIG. 13, in response to the received instruction, information associated with the received instruction may also be displayed on the screen of the user terminal displaying the video being photographed with the camera. For example, a text 1330 representing the received instruction, that is, "Please close your eyes" may also be displayed on the screen of the user terminal displaying the video being photographed. Further, a character image 1320 representing the received instruction may also be displayed on the screen of the user terminal. By referring to the text 1330 and/or the character image 1320, the user may perform the action corresponding to the received instruction, and the user verification system 300 receiving the photographed video of this action in real-time may determine presence or absence of the user in the video.

Figure 14:
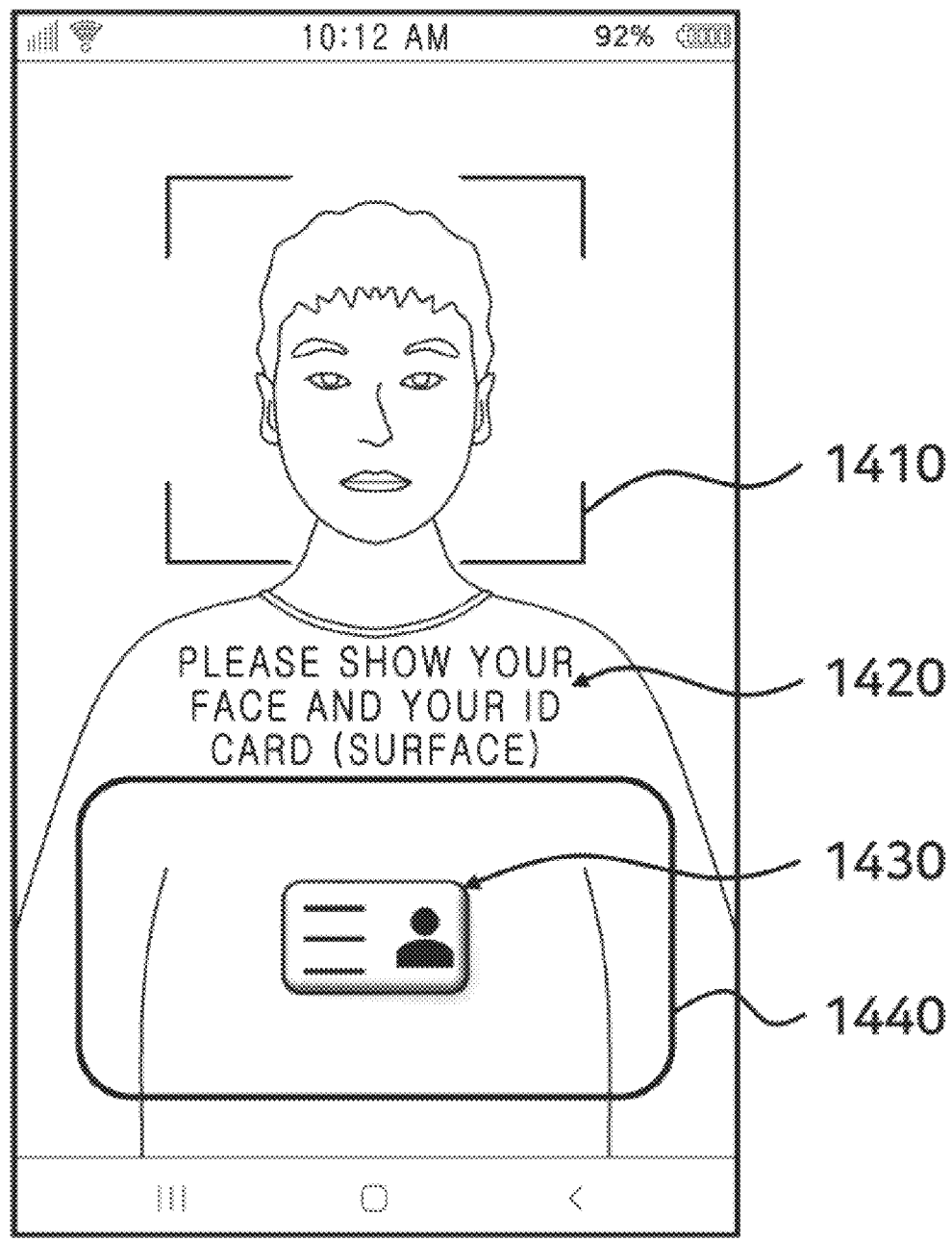
FIG. 14 is a diagram illustrating an example of photographing a user and a user's identification (ID) card together in response to an instruction according to an example embodiment.

FIG. 14 is a diagram illustrating an example of photographing a user and a user's ID card together in response to an instruction according to an example embodiment. According to the present example embodiment, the user terminal may receive an instruction "Please show your face and your ID card (surface)" from the user verification system 300. In response to this instruction, as illustrated, the user may act to place his or her face in an area 1410 displayed on the screen being photographed with the camera. At the same time, the user may act to place the ID card in an area 1440 displayed on the screen. When this action is performed, a photographed video of the face and ID card of the user may be transmitted in real-time to the user verification system 300. In response, the user verification system 300 may analyze the photographed video in the area 1410 and/or the area 1440 in the video during the user verification process.

As illustrated, in response to the received instruction, information associated with the received instruction may also be displayed on the screen of the user terminal displaying the video being photographed with the camera. According to an example embodiment, a text 1420 representing the received instruction, that is, "Please show your face and your ID card (surface)" may also be displayed on the screen of the user terminal displaying the video being photographed. In addition, an ID card image 1430 representing the received instruction may also be displayed on the screen of the user terminal. By referring to the information displayed on the screen, the user may perform an action corresponding to the received instruction, and the user verification system 300 receiving the photographed video of this action may extract the face of the user from the video. The face image extracted from the photographed video of the front face in FIG. 11, and the face image extracted from the photographed video of the ID card may be compared with each other and used to verify the user.

According to an example embodiment, different settings may be applied to the area 1410 in which at least a part of the user (In this example, at least a part of a user including the face of the user) is photographed, and the area 1440 in which an ID card is photographed. For example, different channels may be applied to the two areas, respectively, such that videos photographed in the two areas may be transmitted to the user verification system 300 through the set channels, respectively. As another example, different resolutions may be applied to the two areas, respectively, such that videos photographed in the two areas may be videos photographed with different resolutions. In an example, the resolution of the video photographed in the area 1440 in which the ID card is guided to be photographed may be higher than the resolution of the area 1410 in which at least a part of the user is guided to be photographed.

Figure 15:
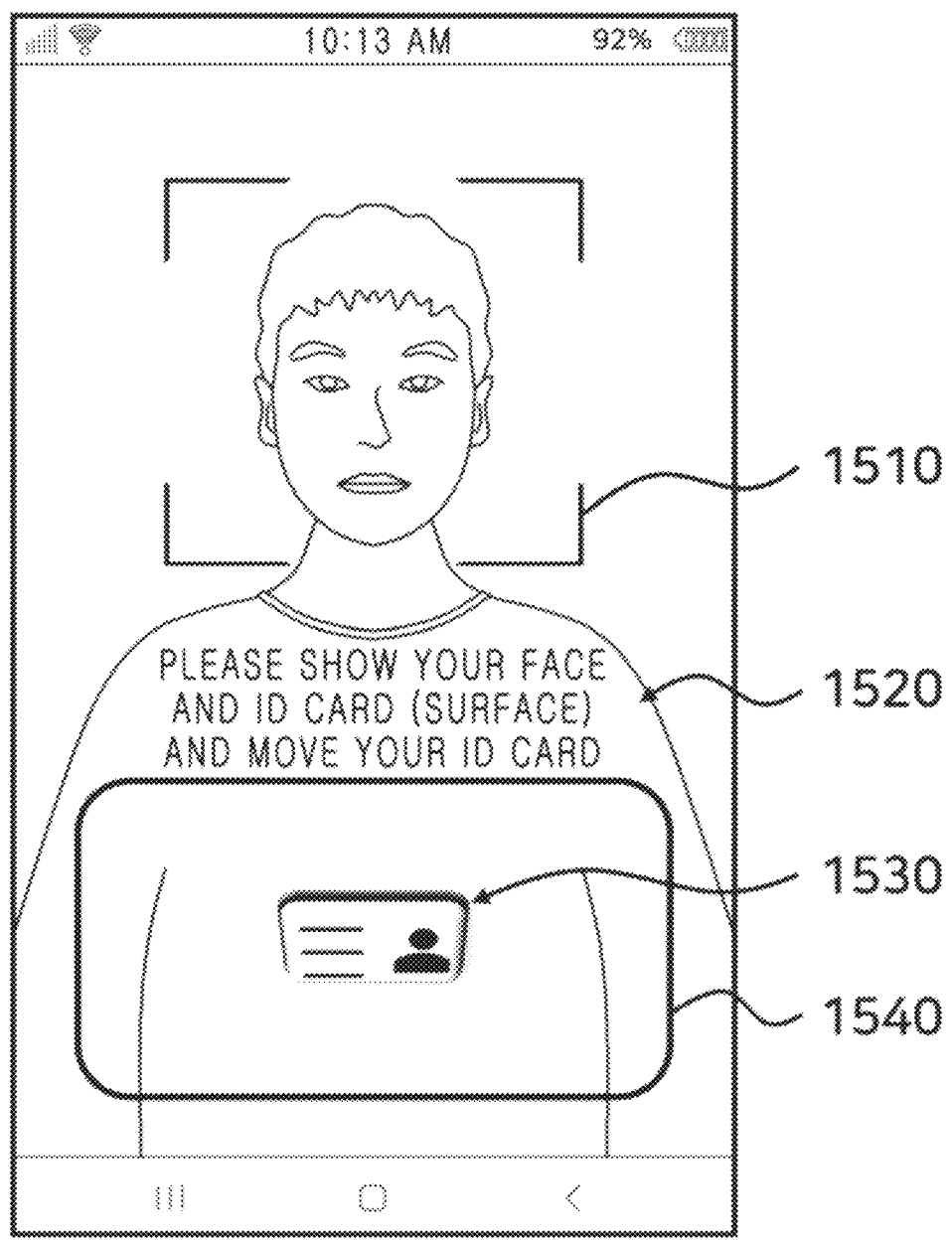
FIG. 15 is a diagram illustrating an example of photographing a movement of an ID card in response to an instruction in order to determine whether a user's ID card is present according to an example embodiment.

FIG. 15 is a diagram illustrating an example of photographing a movement of an ID card in response to an instruction in order to determine whether a user's ID card is present according to an example embodiment. According to an example embodiment, the user terminal may receive an instruction "Please show your face and ID card (surface) and move your ID card" from the user verification system 300. In response to this instruction, the user may act to place his or her face in an area 1510 displayed on the screen being photographed with the camera. At that time, the user may perform an action of placing the ID card in another area 1540 of the screen being photographed with the camera and moving the ID card. When this action is performed, a photographed video of the face of the user and an action of moving ID card of the user may be transmitted in real-time to the user verification system 300. In response, the user verification system 300 may analyze the photographed video in the area 1510 and/or the area 1540 in the video during the user verification process.

In FIG. 15, in response to the received instruction, information associated with the received instruction may also be displayed on the screen of the user terminal displaying the video being photographed with the camera. For example, a text 1520 representing the received instruction, that is, "Please show your face and ID card (surface) and move your ID card" may also be displayed on the screen of the user terminal displaying the video being photographed. In addition, an ID card image 1530 and an ID card area 1540 representing the received instruction may also be displayed on the screen of the user terminal. When the user uses this information displayed on the screen, the user may perform an action corresponding to the received instruction, and the user verification system 300 receiving the photographed video of such an action in real-time may determine presence and absence of the ID card. For example, the user verification system 300 may determine the presence and absence of the ID card in the video based on the movement of the user's ID card obtained by analyzing the video. The user verification system 300 may be configured to verify the user when the ID card is present.

The method for verifying users described above may be implemented as a computer-readable code on a computer-readable recording medium. The computer-readable recording medium includes all kinds of recording devices in which data readable by a computer system is stored. Examples of computer-readable recording medium include ROM, RAM, CD-ROM, magnetic tape, floppy disks, optical data storage devices, and the like. Further, the computer-readable recording medium may be distributed over network coupled computer systems so that the computer-readable code is stored and executed in a distributed manner. Further, programmers in the technical field pertinent to the present disclosure will be easily able to envision functional programs, codes and code segments to implement the example embodiments.

The methods, operations, or techniques of this disclosure may be implemented by various means. For example, these techniques may be implemented in hardware, firmware, software, or a combination thereof. Those skilled in the art will further appreciate that the various illustrative logical blocks, modules, circuits, and algorithm steps described in connection with the disclosure herein may be implemented in electronic hardware, computer software, or combinations of both. To clearly illustrate this interchangeability of hardware and software, various illustrative components, blocks, modules, circuits, and steps have been described above generally in terms of their functionality. Whether such a function is implemented as hardware or software varies depending on design requirements imposed on the particular application and the overall system. Those skilled in the art may implement the described functions in varying ways for each particular application, but such implementation should not be interpreted as causing a departure from the scope of the present disclosure.

In a hardware implementation, processing units (e.g., processor) used to perform the techniques may be implemented in one or more ASICs, DSPs, digital signal processing devices (DSPDs), programmable logic devices (PLDs), field programmable gate arrays (FPGAs), processors, controllers, microcontrollers, microprocessors, electronic devices, other electronic units designed to perform the functions described in the disclosure, computer, or a combination thereof.

Accordingly, various example logic blocks, modules, and circuits described in connection with the disclosure may be implemented or performed with general purpose processors, DSPs, ASICs, FPGAs or other programmable logic devices, discrete gate or transistor logic, discrete hardware components, or any combination of those designed to perform the functions described herein. A general purpose processor may be a microprocessor, but in the alternative, the processor may be any conventional processor, controller, microcontroller, or state machine. The processor may also be implemented as a combination of computing devices, for example, a DSP and microprocessor, a plurality of microprocessors, one or more microprocessors associated with a DSP core, or any other combination of the configurations.

In the implementation using firmware and/or software, the techniques may be implemented with instructions stored on a computer-readable medium, such as random access memory (RAM), read-only memory (ROM), non-volatile random access memory (NVRAM), programmable read-only memory (PROM), erasable programmable read-only memory (EPROM), electrically erasable PROM (EEPROM), flash memory, compact disc (CD), magnetic or optical data storage devices, and the like. The commands may be executable by one or more processors, and may cause the processor(s) to perform certain aspects of the functions described in the present disclosure.

When implemented in software, the techniques may be stored on a computer-readable medium as one or more command or codes, or may be transmitted through a computer-readable medium. The computer-readable media include both the computer storage media and the communication media including any medium that facilitates the transfer of a computer program from one place to another. The storage media may also be any available media that may be accessed by a computer. By way of non-limiting example, such a computer-readable medium may include RAM, ROM, EEPROM, CD-ROM or other optical disk storage, magnetic disk storage or other magnetic storage devices, or any other media that can be used to transfer or store desired program code in the form of instructions or data structures and can be accessed by a computer. In addition, any connection is properly referred to as a computer-readable medium.

For example, when the software is transmitted from a website, server, or other remote sources using coaxial cable, fiber optic cable, twisted pair, digital subscriber line (DSL), or wireless technologies such as infrared, wireless, and microwave, the coaxial cable, the fiber optic cable, the twisted pair, the digital subscriber line, or the wireless technologies such as infrared, wireless, and microwave are included within the definition of the medium. The disks and the discs used herein include CDs, laser disks, optical disks, digital versatile discs (DVDs), floppy disks, and Blu-ray disks, where disks usually magnetically reproduce data, while discs optically reproduce data using a laser. The combinations described above should also be included within the scope of the computer-readable media.

The software module may reside in, RAM memory, flash memory, ROM memory, EPROM memory, EEPROM memory, registers, hard disk, removable disk, CD-ROM, or any other form of storage medium known. An example storage medium may be connected to the processor, such that the processor may read or write information from or to the storage medium. Alternatively, the storage medium may be integrated into the processor. The processor and the storage medium may exist in the ASIC. The ASIC may exist in the user terminal. Alternatively, the processor and storage medium may exist as separate components in the user terminal.

Although the example embodiments described above have been described as utilizing aspects of the currently disclosed subject matter in one or more standalone computer systems, the present disclosure is not limited thereto, and may be implemented in conjunction with any computing environment, such as a network or distributed computing environment. Furthermore, aspects of the subject matter in this disclosure may be implemented in multiple processing chips or devices, and storage may be similarly influenced across a plurality of devices. Such devices may include PCs, network servers, and portable devices.

Although the present disclosure has been described in connection with some example embodiments herein, various modifications and changes can be made without departing from the scope of the present disclosure, which can be understood by those skilled in the art to which the present disclosure pertains. Further, such modifications and changes should be considered within the scope of the claims appended herein.

What is claimed is:

1. A method for verifying users performed by at least one processor, comprising:
   transmitting, to a user terminal, a plurality of instructions that guide a user to perform a plurality of actions and at least one of a plurality of resolutions or transmission rates corresponding to the plurality of instructions, respectively, the plurality of instructions being randomly selected from an instruction information database, the instruction information database constructed with a plurality of instruction candidates, resolutions, transmission rates in association with each other;
   receiving, from the user terminal, a video of an action of the user photographed in response to each of the plurality of instructions;
   determining presence or absence of the user in the video; and
   verifying the user based on a face of the user extracted from the video in response to a result of the determining indicating that the user is present.

2. The method of claim 1, wherein the receiving includes receiving the video from the user terminal in real-time through a channel for communication with the user terminal.

3. The method of claim 2, wherein the receiving includes continuously receiving the video through the channel for communication with the user terminal.

4. The method of claim 1, wherein the determining includes:
   analyzing the video and first-determining whether the user performs the plurality of actions corresponding to the plurality of instructions in the video; and
   second-determining that the user is present in the video, in respond to a result of the first-determining indicating that the user performs the plurality of actions corresponding to the plurality of instructions.

5. The method of claim 1, wherein
the plurality of instructions includes a first instruction and a second instruction,
the receiving includes,
receiving, from the user terminal, a face-related video photographed in response to the first instruction that guides to have a face of the user photographed, and
receiving, from the user terminal, an identification (ID) card-related video photographed in response to the second instruction that guides to have an ID card of the user photographed, and
the verifying includes,
extracting first information on the face of the user from the face-related video,
extracting second information on the face of the user from the ID card-related video,
comparing the extracted first information and the extracted second information, and
verifying the user in response to the extracted first information and the extracted second information being similar to each other with reference to a reference similarity value.

6. The method of claim 5, wherein the plurality of instructions include a third instruction that guides to have a front face of the user photographed.

7. The method of claim 5, wherein
the plurality of instructions includes a fourth instruction that guides to move the ID card of the user,
the receiving the ID card-related video includes receiving, from the user terminal, a video of the ID card of the user photographed according to the fourth instruction, and
the verifying the user includes determining presence or absence of the ID card of the user in the video based on a movement of the ID card of the user obtained by analyzing the video.

8. The method of claim 5, wherein
the ID card-related video includes a photographed video of at least a part of the user together with the ID card of the user, and
the receiving the ID card-related video includes,
receiving a first area including at least the part of the user from the user terminal through a first channel, and
receiving a second area including the ID card of the user from the user terminal through a second channel.

9. The method of claim 1, wherein
the transmitting includes transmitting, to the user terminal, a first instruction that guides the user to perform a first action from among the plurality of instructions,
the receiving includes receiving, from the user terminal, a first video photographed in response to the first instruction, and
the determining includes analyzing the first video photographed in response to the first instruction and determining whether the user performs the first action in response to the first instruction.

10. The method of claim 9, wherein
the transmitting includes transmitting, to the user terminal, a second instruction that guides the user to perform a second action from among the plurality of instructions, in response to a result of the determining indicating that the user performs the first action,
the receiving includes receiving, from the user terminal, a second video photographed in response to the second instruction, and
the determining includes analyzing the second video photographed in response to the second instruction and determining whether the user performs the second action in response to the second instruction.

11. The method of claim 9, wherein
the transmitting includes transmitting, to the user terminal, a third instruction that guides the user to perform a third action, in response to a result of the determining indicating that the user does not perform the first action, and
the third instruction is selected based on a difference between the action of the user obtained from analysis of the first video photographed in response to the first instruction and the first action.

12. The method of claim 9, further comprising:
communicating with the user terminal using a first channel different from a second channel used for communication with the user terminal in response to a result of the determining indicating that the user does not perform the first action.

13. The method of claim 1, wherein the transmitting includes transmitting, to the user terminal, information on a plurality of resolutions corresponding to the plurality of instructions together with the plurality of instructions.

14. The method of claim 13, wherein each of the plurality of resolutions corresponding to the plurality of instructions include a resolution for a corresponding one of a plurality of areas on a screen displaying the video photographed corresponding to the plurality of instructions.

15. The method of claim 13, wherein
the plurality of instructions include an instruction that guides to have at least a part of the user and an identification (ID) card of the user photographed together,
the plurality of resolutions includes a first resolution and a second resolution, and
the first resolution of a first area in which the ID card of the user is guided to be photographed is set to be higher than the second resolution of a second area in which at least the part of the user is guided to be photographed.

16. The method of claim 1, wherein at least some of the plurality of instructions include example images representing actions corresponding to the at least some of the plurality of instructions, respectively.

17. The method of claim 1, wherein the plurality of instructions further include information on a plurality of channels through which videos photographed from a plurality of areas on a screen of the user terminal are to be transmitted, respectively.

18. The method of claim 1, wherein the verifying includes adjusting a rate of extracting one or more images from the received video based on the transmission rates included in the plurality of instructions.

19. A non-transitory computer-readable recording medium storing computer-readable instructions that, when executed by at least one processor, cause a computer to execute the method of claim 1.

20. A system for verifying users comprising:
a memory; and
at least one processor connected to the memory and configured to execute computer-readable instructions stored in the memory such that the at least one processor is configured to cause the system to, transmit, to a user terminal, a plurality of instructions that guide a user to perform a plurality of actions and at least one of a plurality or resolutions or transmission rates corresponding to the plurality of instructions, respectively, the plurality of instructions being randomly selected from an instruction information database, the instruction information database constructed with a plurality of instruction candidates, resolutions, transmission rates in association with each other, receive, from the user terminal, a video of an action of the user photographed in response to the plurality of instructions, determine presence or absence of the user in the video, and verify the user based on a face of the user extracted from the video, in response to a result of a determination result indicating that the user is present.

21. The system of claim 20, wherein the at least one processor is further configured to cause the system to receive the video from the user terminal in real-time through a channel for communication with the user terminal.

\* \* \* \* \*